(12) United States Patent
Shinohara et al.

(10) Patent No.: US 8,422,873 B2
(45) Date of Patent: *Apr. 16, 2013

(54) IMAGING APPARATUS

(75) Inventors: Junichi Shinohara, Yokohama (JP);
Koji Yokoyama, Yokohama (JP); Mayu Takano, Kawasaki (JP); Hiroshi Morohoshi, Yokohama (JP)

(73) Assignee: Ricoh Corporation, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/476,040

(22) Filed: May 21, 2012

(65) Prior Publication Data

US 2012/0230662 A1    Sep. 13, 2012

Related U.S. Application Data

(60) Division of application No. 13/022,446, filed on Feb. 7, 2011, now Pat. No. 8,204,369, which is a continuation of application No. 12/207,930, filed on Sep. 10, 2008, now Pat. No. 7,907,836.

(30) Foreign Application Priority Data

Sep. 12, 2007    (JP) .................. 2007-236996
Oct. 26, 2007    (JP) .................. 2007-279572
Dec. 28, 2007    (JP) .................. 2007-341128

(51) Int. Cl.
*G03B 17/00*    (2006.01)
*G03B 17/18*    (2006.01)

(52) U.S. Cl.
USPC .......................... 396/50; 396/281

(58) Field of Classification Search ........... 396/50, 396/52, 281–283, 287, 290–292; 348/208.2, 348/208.3, 333.01, 333.02, 333.04; 33/365
See application file for complete search history.

(56) References Cited

U.S. PATENT DOCUMENTS

| | | | |
|---|---|---|---|
| 5,070,356 A | 12/1991 | Nakamura et al. |
| 5,150,143 A | 9/1992 | Ohno et al. |
| 5,192,860 A | 3/1993 | Shinohara et al. |
| 5,192,964 A | 3/1993 | Shinohara et al. |
| 5,270,755 A | 12/1993 | Ohno et al. |
| 5,293,034 A | 3/1994 | Ohno et al. |
| 5,309,190 A | 5/1994 | Shinohara et al. |

(Continued)

FOREIGN PATENT DOCUMENTS

| | | |
|---|---|---|
| JP | 5-167898 A | 7/1993 |
| JP | 9-102893 A | 4/1997 |

(Continued)

*Primary Examiner* — W. B. Perkey
*Assistant Examiner* — Minh Phan
(74) *Attorney, Agent, or Firm* — Dickstein Shapiro LLP

(57) ABSTRACT

An imaging apparatus whose posture is easily adjustable is provided. The imaging apparatus is configured to include an inclination detector detecting a degree of inclination of one of the imaging apparatus and an image captured by the imaging apparatus relative to a horizontal direction orthogonal to a direction of gravity; a display unit; a first inclination indicator unit allowing the display unit to display an indicator to indicate the degree of inclination according to a detection result from the inclination detector; a second inclination indicator unit notifying via sound according to a detection result from the inclination detector that the degree of inclination is over a predetermined value; and a selector unit allowing at least one of the first and second inclination indicator units to operate.

17 Claims, 39 Drawing Sheets

U.S. PATENT DOCUMENTS

| | | |
|---|---|---|
| 5,682,563 A | 10/1997 | Shinohara et al. |
| 7,247,048 B2 | 7/2007 | Yokoyama |
| 7,259,923 B2 | 8/2007 | Nuno et al. |
| 7,280,147 B2 | 10/2007 | Kitajima et al. |
| 7,286,164 B2 | 10/2007 | Shinohara et al. |
| 7,301,579 B2 | 11/2007 | Shinohara et al. |
| 7,365,790 B2 | 4/2008 | Shinohara |
| 7,505,216 B2 | 3/2009 | Nuno |
| 7,554,578 B2 * | 6/2009 | Molgaard ........... 348/231.3 |
| 7,701,504 B2 | 4/2010 | Niwa |
| 7,907,836 B2 | 3/2011 | Shinohara et al. |
| 2004/0100561 A1 | 5/2004 | Shinohara et al. |
| 2005/0012846 A1 | 1/2005 | Shinohara |
| 2005/0117024 A1 | 6/2005 | Lee |
| 2005/0200737 A1 | 9/2005 | Shinohara et al. |
| 2006/0064888 A1 | 3/2006 | Chen |
| 2006/0204232 A1 | 9/2006 | Weinberg et al. |
| 2006/0209192 A1 | 9/2006 | Shinohara et al. |
| 2007/0086772 A1 | 4/2007 | Shinohara |
| 2007/0232156 A1 | 10/2007 | Yokoyama |
| 2007/0245578 A1 | 10/2007 | Clark et al. |
| 2008/0024654 A1 | 1/2008 | Shinohara |
| 2008/0036901 A1 | 2/2008 | Shinohara et al. |
| 2008/0043287 A1 | 2/2008 | Shinohara et al. |
| 2008/0050019 A1 | 2/2008 | Morohoshi |
| 2008/0204566 A1 | 8/2008 | Yamazaki et al. |
| 2008/0218622 A1 | 9/2008 | Shinohara |
| 2008/0231889 A1 | 9/2008 | Morohoshi |
| 2011/0109756 A1 | 5/2011 | Yamazaki et al. |
| 2011/0109757 A1 | 5/2011 | Yamazaki et al. |
| 2011/0109783 A1 | 5/2011 | Yamazaki et al. |
| 2011/0115933 A1 | 5/2011 | Yamazaki et al. |

FOREIGN PATENT DOCUMENTS

| | | |
|---|---|---|
| JP | 2003-280080 | 10/2003 |
| JP | 2004-343476 | 2/2004 |
| JP | 2006-165941 | 6/2006 |
| JP | 2006-287768 | 10/2006 |
| JP | 3896505 | 1/2007 |
| JP | 4043198 | 11/2007 |
| JP | 2009-33500 A | 2/2009 |

* cited by examiner

TRIPOD NOT ATTACHED

TRIPOD ATTACHED

HELD IN THE AIR

PLACED ON THE DESK

HELD IN THE AIR

PLACED ON THE DESK

LEVEL MODE SETTING

| FLAG | MODE | INDICATOR | ALARM SOUND |
|---|---|---|---|
| 0 | OFF | ENFORCED OFF | ENFORCED OFF |
| 1 | AUTO | GENERALLY ON BUT OFF UNDER CERTAIN CONDITION | GENERALLY ON BUT OFF UNDER CERTAIN CONDITION |
| 2 | INDICATOR ON | ENFORCED ON | GENERALLY ON BUT OFF UNDER CERTAIN CONDITION |
| 3 | ALARM ON | GENERALLY ON BUT OFF UNDER CERTAIN CONDITION | ENFORCED ON |
| 4 | ENFORCED ON | ENFORCED ON | ENFORCED ON |

FIG. 14A

LEVEL MODE SETTING

| FLAG | MODE | INDICATOR | ALARM SOUND |
|---|---|---|---|
| 0 | OFF | ENFORCED OFF | ENFORCED OFF |
| 1 | AUTO | GENERALLY OFF BUT ON UNDER CERTAIN CONDITION | GENERALLY ON BUT OFF UNDER CERTAIN CONDITION |
| 2 | INDICATOR ON | ENFORCED ON | GENERALLY ON BUT OFF UNDER CERTAIN CONDITION |
| 3 | ALARM ON | GENERALLY OFF BUT ON UNDER CERTAIN CONDITION | ENFORCED ON |
| 4 | ENFORCED ON | ENFORCED ON | ENFORCED ON |

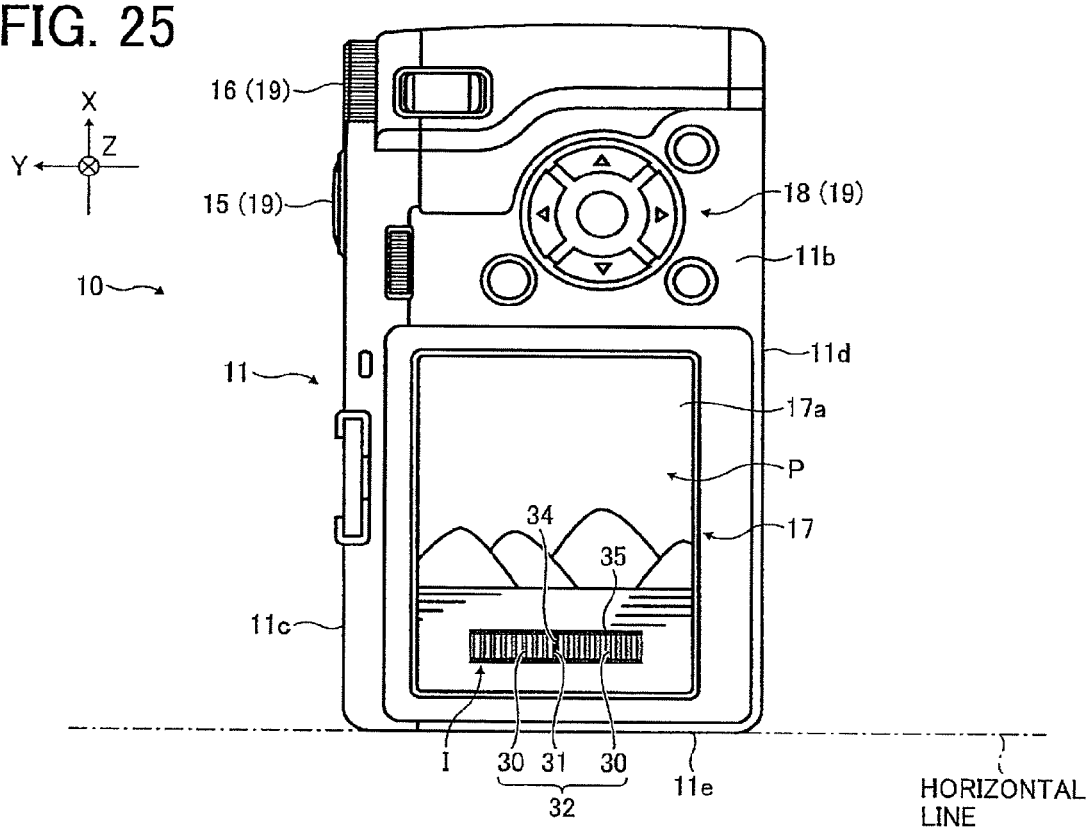
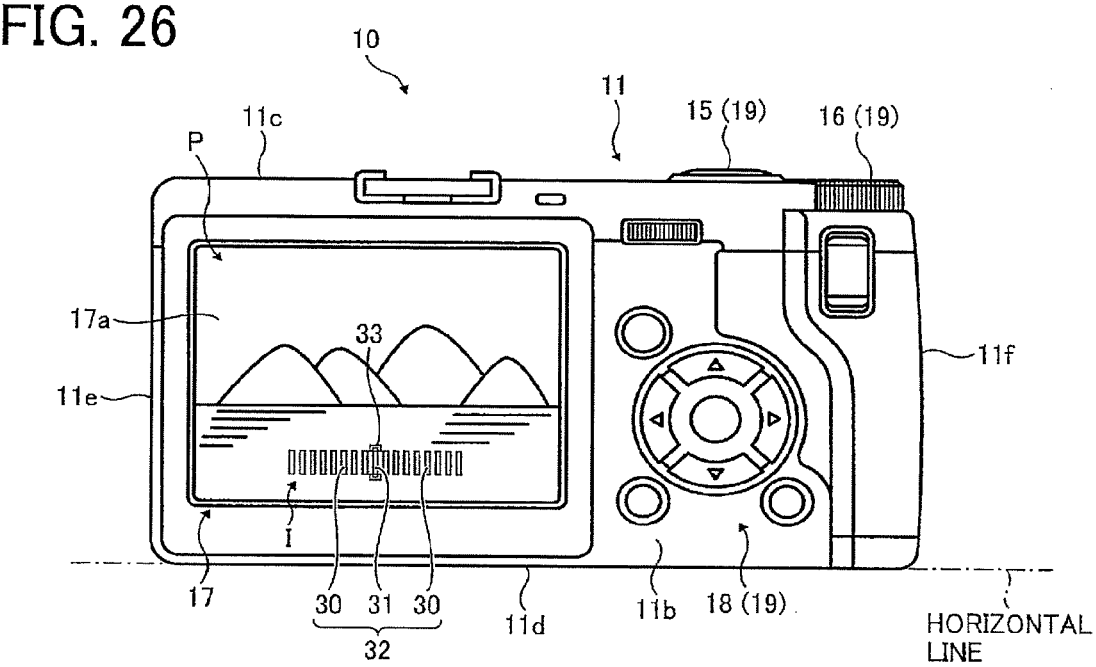

IMAGING APPARATUS

CROSS REFERENCE TO RELATED APPLICATIONS

The present application is a divisional of application Ser. No. 13/022,446, filed on Feb. 7, 2011, now U.S. Pat. No. 8,204,369 which is a continuation of application Ser. No. 12/207,930, filed on Sep. 10, 2008, now U.S. Pat. No. 7,907,836, the entire disclosures of which are incorporated herein by reference thereto, and is based on and claims priority from Japanese Patent Application No. 2007-236996, filed on Sep. 12, 2007, Japanese Patent Application No. 2007-279572, filed on Oct. 26, 2007, and Japanese Patent Application No. 2007-341128, filed on Dec. 28, 2007, the entire disclosures of which are incorporated herein by reference thereto.

BACKGROUND OF THE INVENTION

1. Field of the Invention

The present invention relates to an imaging apparatus which comprises an indicator unit to notify a user of a degree of inclination of the apparatus relative to a horizontal plane or presence of inclination thereof, and automatically switching means to notify them in accordance with a held state and/or fixed state of the apparatus.

2. Description of Related Art

There is a known imaging apparatus (camera) which has a function as a spirit level to detect a posture of the apparatus and notify a user of amount of inclination thereof and/or a direction of the inclination relative to a horizontal direction (orthogonal to direction of gravity). For example, Japanese Laid-open Patent Application Publication No. 2006-287768 discloses an imaging apparatus which notifies inclination of the apparatus to a user by changing illumination patterns of an LED for focus adjustment.

Further, Japanese Laid-open Patent Application Publication No. 2004-343476 discloses an imaging apparatus which displays an indicator of stick-like pattern superimposedly on a subject image on a screen at shooting, to indicate a current inclination with a moving index mark as a spirit level does and help a user know the posture of the imaging apparatus (inclination of a captured image). However, there is a problem in this imaging apparatus that since the index mark continuously moves in the indicator in accordance with the inclination of the apparatus unless the apparatus becomes completely still, it is difficult for the user to know when it becomes horizontal. In addition, the indicator can be a visual annoyance to the user.

Further, Japanese Patent No. 3896505 discloses an imaging apparatus which assists a user to know the posture of the apparatus or the inclination of a captured image by displaying a referential horizontal line and an assist line indicating a current posture of the apparatus on a screen.

Moreover, Japanese Laid-open Patent Application Publication No. 2006-165941 discloses an imaging apparatus which assists a user to know the posture of the apparatus or the inclination of a captured image by displaying grid lines indicating a referential horizontal state and a horizontal line indicating a current horizontal direction of the apparatus in different colors and displaying the grid lines in a different color from the original colors of both of the lines when the horizontal line coincides with one of the grid lines.

However, these imaging apparatuses have a similar problem that the assist line (horizontal line) constantly moves in accordance with the inclination of the apparatus unless the apparatus becomes completely still. Therefore, it is difficult for the user to know when the apparatus becomes horizontal, and the assist line can be a visual annoyance to the user. In addition, since the assist line (horizontal line) getting across the display screen is inclined according to the inclination of the apparatus, affected by resolution of a screen or the like, it may be an unevenly stepwise line instead of a smooth straight line, which may degrade visual quality of the display and cause the user to feel annoyance.

Here, in terms of adjustability of an inclination relative to a horizontal direction, how accurately the imaging apparatus can be adjusted changes depending on a state of the apparatus, that is, held state and/or fixed state (hand-held, fixed by a tripod, for example).

However, the prior art imaging apparatuses above are configured to notify the amount and/or direction of inclination of the apparatus to the user with a constant resolution irrespective of which of states, the held or fixed state or held and fixed state the apparatus is in. The user adjusts the posture of the apparatus based on the notified amount or direction. Because of this, when the resolution of the notified amount or direction of inclination exceeds the resolution at which the user can adjust it manually, it may be difficult and take a lot of time for the user to adjust the posture of the apparatus to a desirable level.

In contrast, when the resolution of the notified amount or direction of inclination is far below the resolution at which the user can adjust it manually, captured images with the adjusted imaging apparatus may still have the amount or direction of inclination and are not satisfiable for the user.

Thus, the prior art imaging apparatuses have another problem that with a large difference in the amount and/or direction of inclination which the user can adjust manually and which the imaging apparatus notifies to the user, the user cannot adjust the amount/direction of inclination, or the posture thereof in a short time easily to capture a desirable image.

SUMMARY OF THE INVENTION

An object of the present invention is to provide an imaging apparatus which is adjustable to be in a desirable posture with ease.

According to one aspect of the present invention, an imaging apparatus comprises an inclination detector detecting a degree of inclination of one of the imaging apparatus and an image captured by the imaging apparatus relative to a horizontal direction orthogonal to a direction of gravity; a display unit; a first inclination indicator unit allowing the display unit to display an indicator to indicate the degree of inclination according to a detection result from the inclination detector; a second inclination indicator unit notifying via sound according to a detection result from the inclination detector that the degree of inclination is over a predetermined value; and a selector unit allowing at least one of the first and second inclination indicator units to operate.

Preferably, in the imaging apparatus the first inclination indicator unit allows the display unit to display the indicator to indicate the degree of inclination with a resolution less than the predetermined value.

Preferably, the imaging apparatus further comprises a shake amount detector detecting an amount of shake of the imaging apparatus, in which the selector unit allows at least one of the first and second inclination indicator units to operate according to a detection result from the shake amount detector.

Preferably, the imaging apparatus further comprises a stability detector detecting a postural stability of the imaging apparatus, in which the selector unit allows at least one of the first and second inclination indicator units to operate according to a detection result from the stability detector.

Preferably, in the imaging apparatus the stability detector detects that the imaging apparatus is mounted on a tripod.

Preferably, in the imaging apparatus the stability detector detects that a bottom surface of the imaging apparatus is made in contact with a physical object which has a shape stable enough to have the imaging apparatus disposed thereon.

Preferably, in the imaging apparatus the stability detector detects that an operator holds the imaging apparatus.

Preferably, in the imaging apparatus the selector unit allows at least one of the first and second inclination indicator units to operate according to a change in time of the detection result from the inclination detector.

Preferably, in the imaging apparatus the indicator comprises a plurality of indicator portions arranged with an equal interval and an index portion being any one of the indicator portions to be highlighted. The imaging apparatus has a preset horizontal criterion. Further, the first inclination indicator unit uses one of the indicator portions located at a center as the index portion to indicate that the imaging apparatus is in a horizontal state, when an angle between the horizontal criterion and the horizontal direction is within a predetermined range of angles. When the imaging apparatus is inclined beyond the predetermined range of angles, the first inclination indicator unit uses one of the indicator portions as the index portion according to the inclination, to indicate the degree of inclination.

Preferably, in the imaging apparatus the indicator includes a target indicator indicating one of the indicator portions located at the center thereof.

Preferably, in the imaging apparatus the first inclination indicator unit highlights the index portion in different colors for indicating the horizontal state and inclined state.

Preferably, in the imaging apparatus, the first inclination indicator unit integrally highlights the indicator portion located at the center, an upper edge line bridging upper ends of all the indicator portions and a lower edge line bridging lower ends of all the indicator portions, to indicate that the imaging apparatus is in the horizontal state.

Preferably, when the imaging apparatus is greatly inclined beyond a range of angles corresponding to an outermost one of the indicator portions, the first inclination indicator unit uses, as the index portion, one of two outermost indicator portions which is in an upper position than the other, and highlights upper and lower ends of indicator portions from the one located at the center to the outermost one in the upper position, to indicate that the imaging apparatus is in an extremely inclined state.

Preferably, in the imaging apparatus the first inclination indicator unit highlights the index portion in different colors for indicating the horizontal state, inclined state and extremely inclined state.

Preferably, in the imaging apparatus the horizontal criterion is set separately for a horizontal position and a vertical position of the imaging apparatus.

Preferably, in the imaging apparatus the first inclination indicator unit allows the display unit to display the indicator near a lower side thereof relative to the direction of gravity.

Preferably, in the imaging apparatus the indicator is at least partially transparent.

Preferably, in the imaging apparatus the predetermined range of angles are set such that relative to the horizontal direction, clockwise rotation angle of the horizontal criterion and counterclockwise rotation angle thereof are to be equal.

BRIEF DESCRIPTION OF THE DRAWINGS

FIG. 14A shows a level mode setting of an imaging apparatus according to the sixth embodiment.

FIG. 25 shows another example of a display unit of the imaging apparatus 10 which displays the posture of the imaging apparatus 10 according to the seventh embodiment;

FIG. 26 shows an inclination indicator I on the display unit when the imaging apparatus 10 is in a horizontal state according to the seventh embodiment;

DETAILED DESCRIPTION OF THE PREFERRED EMBODIMENTS

Figure 1:
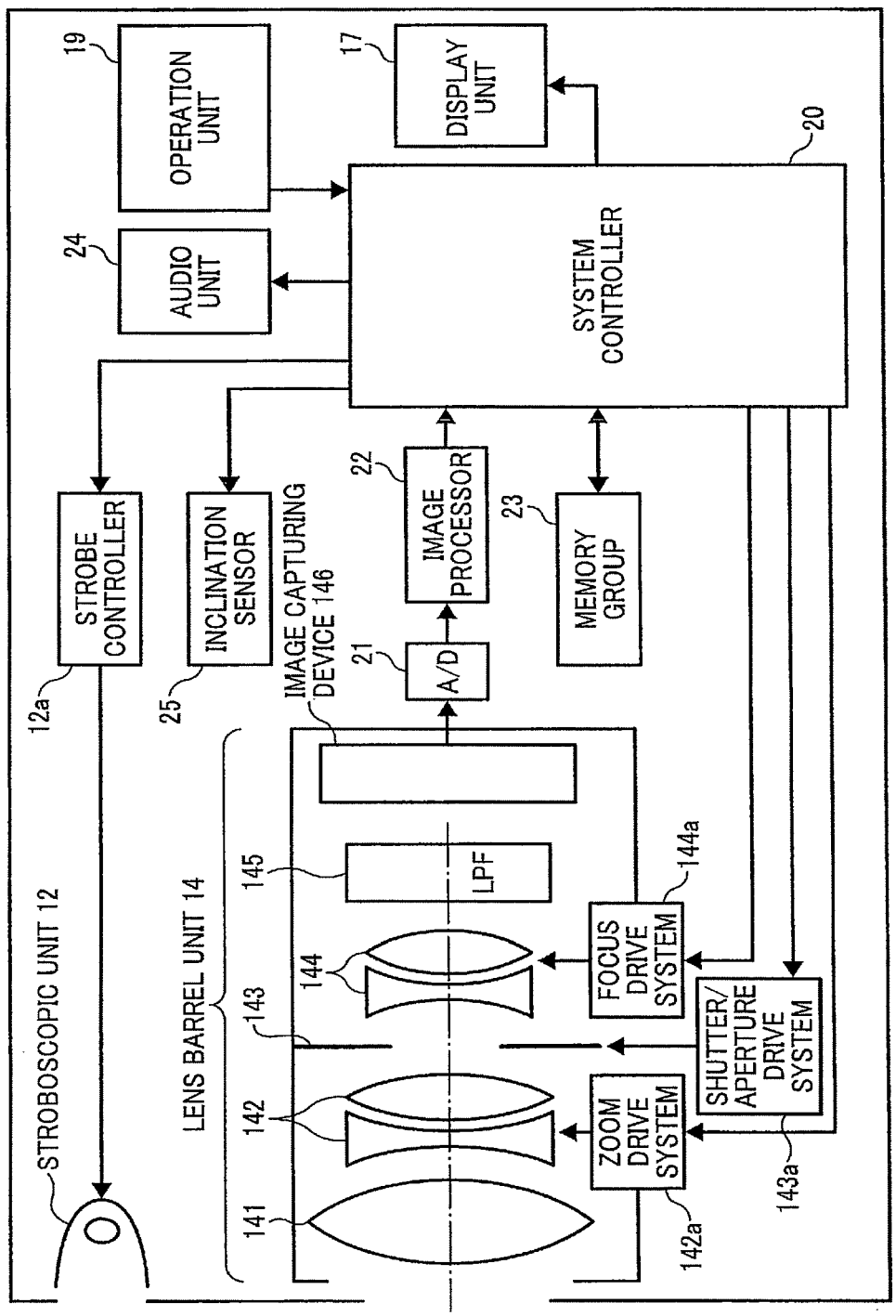
FIG. 1 shows the overall structure of an imaging apparatus according to the present invention.

Hereinafter, embodiments of the present invention will be described in detail with reference to the accompanying drawings. FIG. 1 shows the overall structure of an imaging apparatus (digital camera) 10 according to the present invention.

In FIG. 1, the imaging apparatus comprises a lens barrel unit 14 which is composed of an objective lens 141, a zoom lens 142, a shutter/aperture 143, a focus lens 144, a low pass filter (LPF) 145, an image capturing device 146 and so on.

A zoom drive system 142a, a shutter/aperture drive system 143a, and a focus drive system 144a each having a motor drive the zoom lens 142, shutter/aperture 143, focus lens 144, respectively. A system controller 20 comprised of a microcomputer controls the respective drive systems.

By manipulation to the shutter/aperture 143, a light from a subject is incident on the image capturing device 146 via the objective lens 141, zoom lens 142, shutter/aperture 143, focus lens 144, and low pass filter (LPF) 145, and converted into analog image signals. The image capturing device 146 for photoelectric conversion is a CCD (charge coupling device), for example.

An A/D converter 21 converts analog image signals from the image capturing device 146 into digital image signals which are to be compressed in an image processor 22 and stored in a memory group 23 comprised of a memory card, a flash memory, RAM and so on.

The imaging apparatus 10 also comprises a display unit 17 including an LCD monitor, an LED or the like to display captured images, an operation menu, and the like, an operation unit 19 having mode buttons and so on, an audio unit 24 comprised of a speaker and a buzzer and issuing an alarm sound to a user, a stroboscopic unit 12 emitting strobe light, and a strobe controller 12a controlling the stroboscopic unit 12.

The system controller 20 controls operations of the lens barrel unit 14, A/D controller 21 and others.

The above operation of the imaging apparatus 10 is similar to that of a general imaging apparatus.

The imaging apparatus 10 according to the present invention further comprises a not-shown inclination sensor 25 which detects a direction of acceleration of gravity and is called an acceleration sensor. Owing to the recent remarkable development of various types of acceleration sensor such as MEMS (Micro Electro Mechanical System) sensor, piezoelectric element sensor, the price of the sensor has been decreased enough to be installable in a consumer product.

Figure 2:
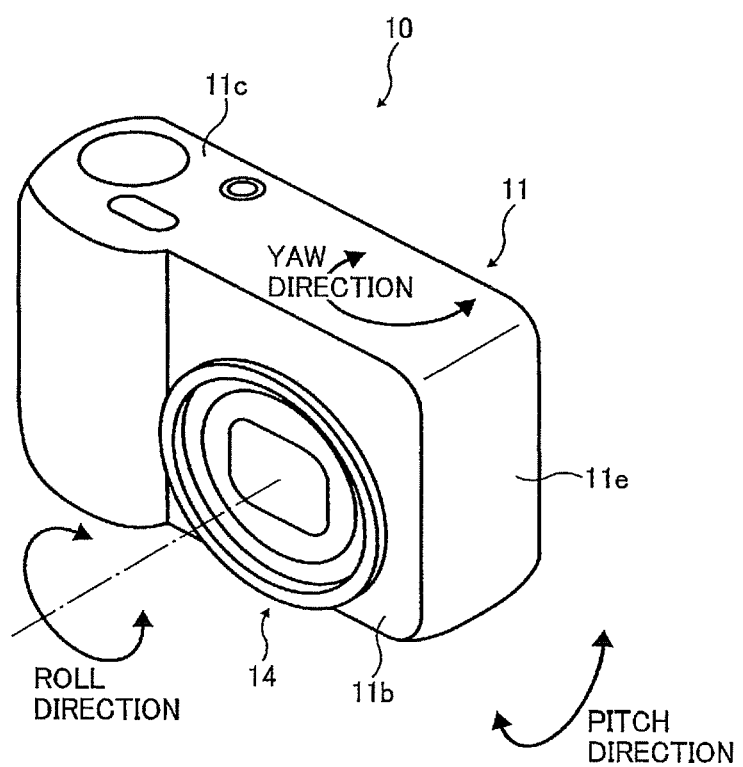
FIG. 2 shows directions of inclination of the imaging apparatus according to the present invention.

FIG. 2 is a view to describe posture of the imaging apparatus 10. For photographing, the most crucial inclination of the camera is an inclination relative to a horizontal direction (horizontal line) (roll direction in FIG. 2). Therefore, the embodiments of the present invention will focus on detection of an inclination in the roll direction for warning and displaying. However, the present invention is applicable to detection thereof in elevation angle direction of the camera (pitch direction in FIG. 2) as well as in both of roll and pitch directions.

First Embodiment

Figure 3:
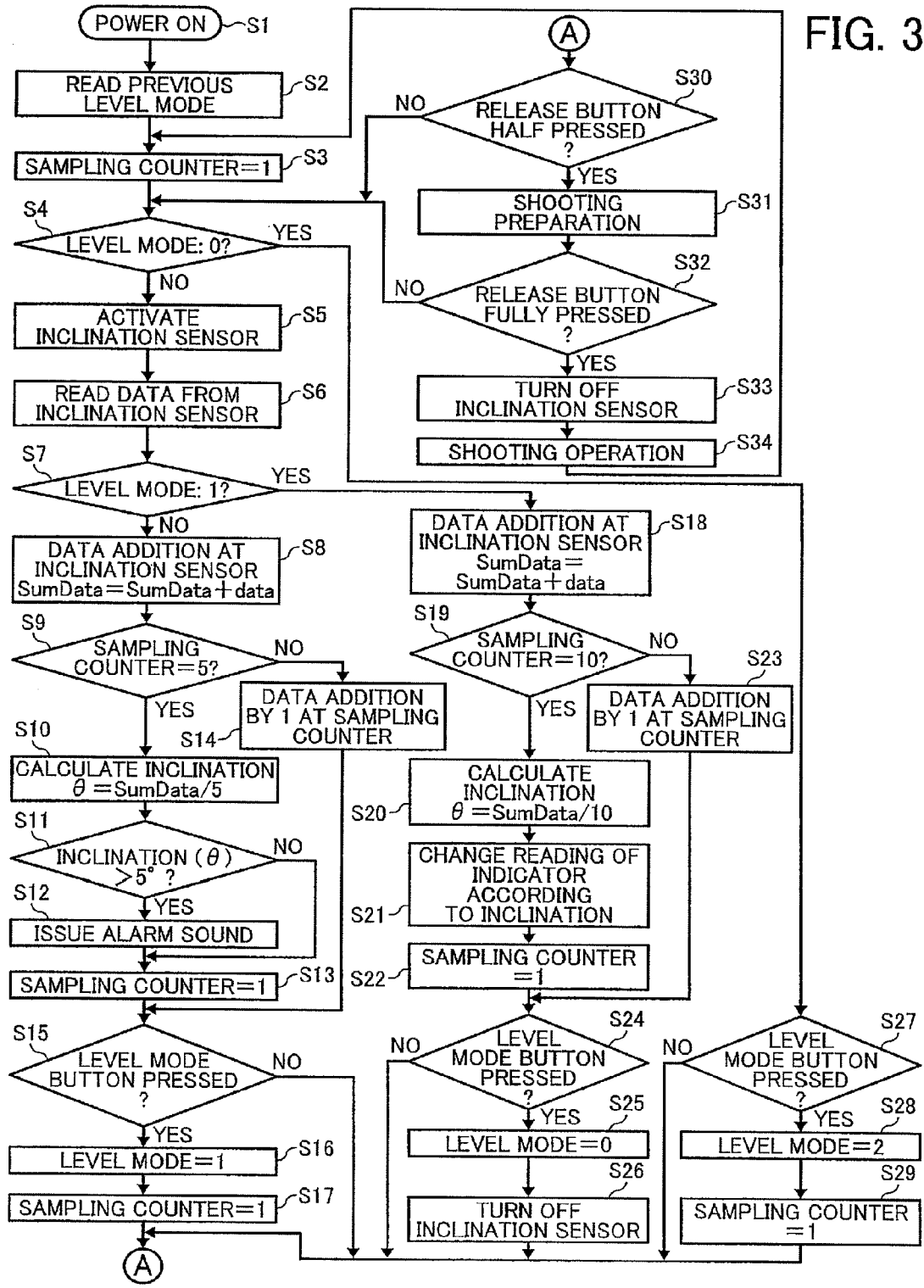
FIG. 3 is a flowchart for operation of an imaging apparatus according to the first embodiment of the present invention.

The imaging apparatus 10 according to the present embodiment comprises three level modes, a level-off mode (flag=0), a high resolution level mode (flag=1, first inclination indicator unit), a low resolution level mode (flag=2, second inclination indicator unit). FIG. 3 is a flowchart for basic operation thereof to continuously switch over the three modes which is executed via mode switch buttons of the imaging apparatus 10.

Upon power-on in S1, a previous level mode is read (S2) and a sampling counter for inclination data is reset (S3). When the previous level mode is a level-off mode (flag=0), the inclination sensor 25 is not to be operated (Yes in S4). When it is a high or low resolution level mode (flag=1 or 2), the inclination sensor 25 is activated in S5, and data (Data) is read therefrom. Numbers of times for data sampling in the high resolution and low resolution level modes are different in accordance with required resolution (S7).

The low resolution level mode will be described in S8 to S17. In S8, data from the inclination sensor are added to obtain added data (SumData). After adding inclination sensor data from 5 samplings (Yes in S9), the mean value is calculated to obtain degree of inclination in S10 (S9 to S14).

Then, when the current degree of inclination (mean value) is over a predetermined value (Yes in S11), an alarm sound is issued from the audio unit 17 (S12). In contrast, when it is equal to or less than the predetermined value (No in S11), the alarm sound is not issued. In S13, the sampling counter is reset for the next five data samplings (S13).

In the present embodiment, the predetermined value is set to 5 degrees. It is preferable to set the predetermined value from about 2 to 5 degrees which the user is likely to recognize as inclination and wish for adjustment. Setting it to a very small value means continuous issuance of alarm sound and setting it to a very large value means a few issuances of alarm sound, which will not function as warning.

Steps S15 to S17 concern an operation when the user manipulates a level mode button (mode switch button) of the operation unit 19. In the present embodiment, upon every press to the mode button, the level mode is changed in order of the low resolution level mode, high resolution level mode, and level-off mode continuously.

When the level mode is changed to the high resolution level mode (Yes in S15), the flag is changed from 2 to 1 in S16, and the sampling counter is reset to zero (S17). In the flowchart it appears that the level mode switching is done upon half-press to the release button at a specific timing. However, the operational flow is completed in a very short time so that the mode determination as in S15 is surely made to change the level mode. In designing an actual imaging apparatus, additional operation is needed in order to prevent chattering of the release button or a long-time press to any manipulation button.

Next, the high resolution level mode will be described in S18 to S26. In the high resolution level mode according to the present embodiment, the number of data samplings is set to 10 and the data is averaged to obtain required data precision. Setting the number to 5 in the low resolution level mode and to 10 in the high resolution level mode is merely a way of showing an example. It can be set to an arbitrary value in accordance with resolution of an actual spirit level installed in the imaging apparatus 10, type of issuance of alarm sound, or resolution required for display.

Steps S18 to S20 and S22 are the same as those in S8 to S10 and S13 in the low resolution level mode so that a description thereon is omitted.

In S21, the display unit 17 displays the mean value (degree of inclination) of inclination data calculated in S20 (inclination indicator).

Figure 4:
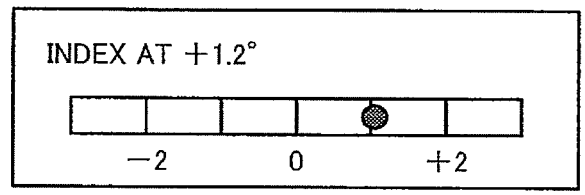
FIG. 4 shows a display example of degree of inclination of the imaging apparatus according to the first embodiment when it is in high resolution level mode.

FIG. 4 shows an example of inclination indicator in the high resolution level mode. In the high resolution level mode, degree of inclination of the camera is indicated only with the inclination indicator while in the low resolution level mode, presence of inclination thereof is notified only via the alarm sound (S12).

In the high resolution level mode, it is preferable to indicate the degree of inclination on the screen, allowing the user to take sufficient time to adjust the posture of the imaging apparatus 10 watching the screen, rather than to issue the alarm sound and force the user to make the adjustment. In the present embodiment, the imaging apparatus 10 is configured to detect the degree of inclination with resolution of 0.2 degrees and display it as in a bubble level. It is necessary to detect inclination with resolution of 0.5 degrees and provide an indicator which can indicate the inclination of 0.5 degree since the inclination of the apparatus ignorable but recognizable for most users is considered to be about 0.5 degrees.

The following steps S24 to S26 for changing the level mode correspond to those S15 to 17 in the low resolution level mode. Upon a user's press to the level mode button (Yes in S24), the level flag is changed from 1 to 0 (level-off mode) (S25) and the inclination sensor is turned off (S26).

The level-off mode steps S27 to S29 only includes the mode change since it is unnecessary to calculate the degree of inclination for displaying the indicator and issuing the alarm sound.

When the user presses the level mode button to change the mode to the low resolution level mode (Yes in S27), the flag is changed from 0 to 2 (S28) and the sampling counter is reset to 0 (S29). Then, returning to S5, the inclination sensor is activated at the flag being zero.

Lastly, after completion of the inclination calculation or display of the inclination indicator, the imaging apparatus 10 while activated is in a standby state for the release button being manipulated in any mode. In S30, it is placed into the standby state for half press to the release button. It is set to be constantly in the standby state for the half press to the release button as for the level mode button. Upon detecting that the release button is halfway pressed, the imaging apparatus 10 starts shooting preparation including autofocus, auto exposure. Then, it shifts to a standby state for full press to the release button. The level mode function needs to operate while the release button is being halfway pressed, so that the operation in S4 to S29 continues even after completion of the shooting preparation.

Meanwhile, upon detecting full press to the release button in S32, the level mode function becomes unnecessary; therefore, the inclination sensor 25 is turned off in S33 for the purpose of power saving and noise reduction. In S34, shooting operation is performed in S34. After the shooting, the operation returns to S3 for collecting inclination data.

According to the present embodiment, the level mode function is started before half-press to the release button and continued thereafter. However, it can be configured to start operating from S4 to S29 only after the half press to the release button.

Thus, the present embodiment is configured to indicate the degree of inclination at an appropriate resolution in accordance with a user's requirement. In order to achieve that, the imaging apparatus 10 comprises the low and high resolution level modes, the former for notifying an inclined state of the apparatus to the user via the alarm sound when the user needs to roughly make posture adjustment, and the latter for displaying the inclination indicator on the screen when the user needs to finely make the posture adjustment.

Moreover, in the low resolution level mode, an interval (for update) at which the posture of the apparatus is determined can be set to be short because the required resolution is low. This enables the user to know the degree of inclination of the imaging apparatus 10 without delay even during a relatively high-speed operation.

In the high resolution level mode in which the user is likely to take sufficient time to decide the posture of the imaging apparatus 10, the number of data samplings of the inclination sensor is increased to obtain the degree of inclination at such a level of precision that the user requires.

Second Embodiment

The second embodiment of the present invention will be described with reference to FIG. 5. The same steps of the flowchart in FIG. 5 as those in FIG. 3 are given the same numerals and description thereon will be omitted. The present embodiment is configured that the user turns on and off the level mode, and at turning-on of the mode the apparatus automatically sets high resolution or low resolution level mode by detecting presence/absence of a tripod. Also, in the low resolution level mode the degree of inclination is notified to the user with the inclination indicator on the screen instead of the alarm sound. In the following only a portion different from the first embodiment will be described.

After steps S1 to S3, whether the level mode is turned on (flag=1) or off (flag=0) is determined in S104. In the present embodiment flag indicates only 0 or 1 since only turning-on or off of the mode need be determined. When the level mode is off, the operation proceeds to S27, S128, and S29.

When the level mode is on (No in S104), detection is made on whether a tripod is attached or not in S107 after S5 and S6. With a tripod attached (Yes in S107), the imaging apparatus 10 automatically shifts to the high resolution level mode while without the tripod (No in S107), it automatically shifts to the low resolution level mode. How to detect the tripod will be described in detail later.

As configured above, it is possible to adjust the posture of the imaging apparatus 10 easily in a short time irrespective of a held state and/or a fixed state of the apparatus.

Without detection of the tripod, the operation proceeds to S8. The present embodiment is configured that in the low resolution level mode requiring less number of data samplings, the sampling counter is reset to 0 when the number of data samplings exceeds a predetermined number (No in S112 and proceeding to S13). This is because immediately after detaching the tripod from the apparatus, the apparatus is automatically shifted from the high resolution to the low resolution level mode (S107), so that there may be inconsistency in the number of data samplings of the sampling counter between the two modes.

Accordingly, level-mode setting is automatically done. When the inclination need be indicated with a high resolution (during use of the tripod in the present embodiment), the apparatus is set in the high resolution level mode, and when the indication with the high resolution is not needed, it is set in the low resolution level mode. This can eliminate necessity for the user to select the level mode. The user has only to turn on and off the level mode.

Figure 6:
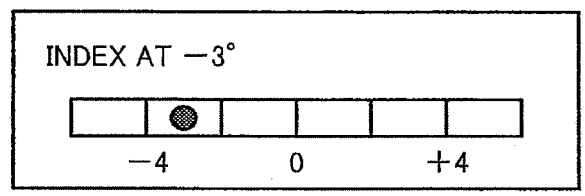
FIG. 6 a display example of degree of inclination of the imaging apparatus according to the second embodiment when it is in low resolution level mode.

Next, the low resolution level mode will be described. In the second embodiment, the inclination indicator is displayed on the upper part of the screen and indication of the inclination is changed in accordance with a change of the degree of inclination (S111). Specifically, as shown in FIG. 6, the resolution of the degree of inclination θ is set to 1 degree and the inclination indicator indicates a current value on the upper part of the display unit 17 as the bubble level does.

According to the present embodiment, the inclination indicator is displayed in the low resolution level mode instead of issuance of the alarm sound. Compared to the indicator in the high resolution level mode (FIG. 4), the resolution is set widely so that it is suitable for the low resolution mode. Further, both of the indicators in the high resolution and low resolution level modes are very similar, allowing simplification of the operation program. Also, without the alarm sound, the user can ignore the inclination indicator when unnecessary and will not be bothered by the alarm sound.

Figure 7A:
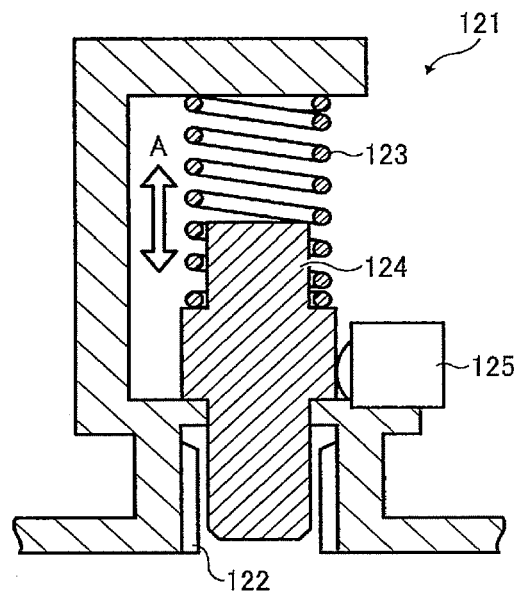
FIGS. 7A, 7B show a tripod detector of the imaging apparatus according to the second embodiment.
Figure 7B:
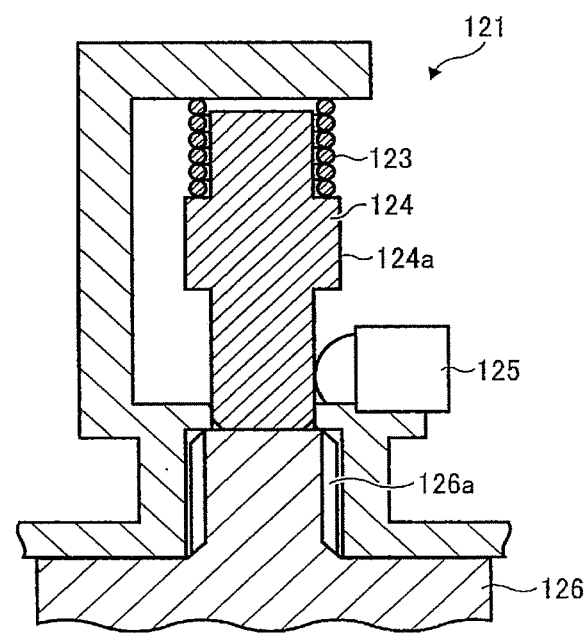

In the following, detection of the tripod which triggers automatic setting of the high resolution level mode will be described. FIG. 7A shows an example of a tripod detector. The tripod detector 121 comprises a tripod screw 122 as a female screw in the bottom of the imaging apparatus 10, a tripod sensor 124 biased by a spring 123 to protrude into the tripod screw 122, and a detection switch 125 detecting presence/absence of the tripod 126 in the tripod screw 122. The tripod sensor 124 moves in a direction (indicated by the arrow A) of movement of a male screw 126a of the tripod 126. As shown in FIG. 7B, when the male screw 126a of the tripod 126 is inserted into the tripod screw 122, the detection switch 125 is released from pressure from a protrusion 124a of the tripod sensor 124 to thereby detect attachment of the tripod 126.

Figure 8A:
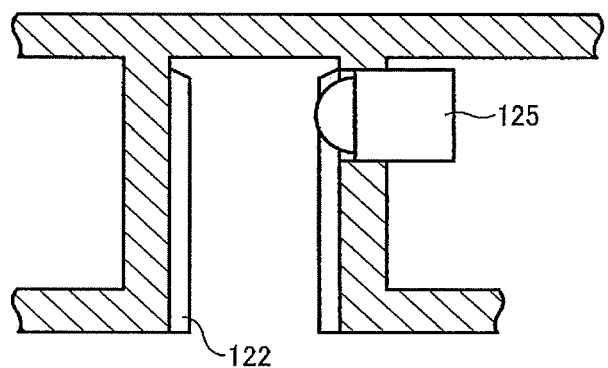
FIGS. 8A, 8B show another tripod detector of the imaging apparatus according to the second embodiment.
Figure 8B:
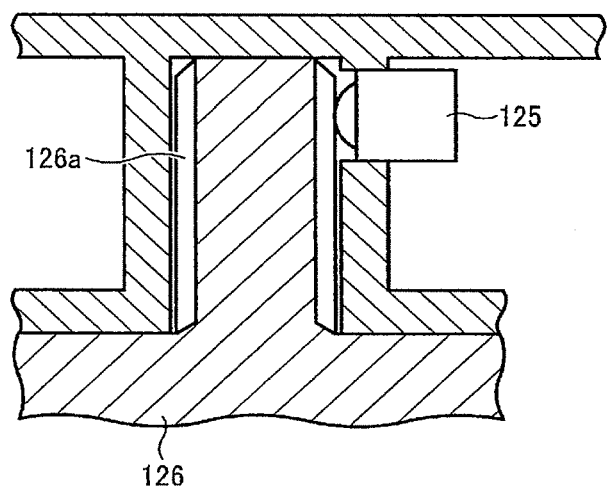

To simplify the structure of the tripod detector 121, the detection switch 125 can be configured to directly detect the top of the male screw 126a of the tripod 126, as shown in FIGS. 8A, 8B. Specifically, the detection switch 125 is provided in the tripod screw 122. As shown in FIG. 8B, the inserted male screw 126a pushes the detection switch 125 and allows it to detect the attachment of the tripod 126.

Generally, at photographing with a camera on the tripod, it is unlikely that the inclination angle of the camera often varies. Therefore, in the high resolution level mode, it is possible to accurately adjust the posture of the apparatus without detecting the inclination at high sensitivity. Automatically placing the imaging apparatus 10 into the high resolution level mode during use of the tripod makes it easier for the user to adjust the posture of the apparatus and improve usability thereof.

Third Embodiment

The third embodiment of the present invention will be described with reference to FIG. 9. The same steps of the flowchart in FIG. 9 as those in FIGS. 3, 5 are given the same numerals and description thereon will be omitted. The present embodiment is configured same as the second embodiment that the user turns on and off the level mode, and at turning-on of the level mode the apparatus automatically sets the high resolution or low resolution level mode according to detection or non-detection of the tripod. The third embodiment is different from the second embodiment in including steps S11, S12 in FIG. 3 in replace of S111 in FIG. 5.

In the present embodiment, automatically switching the high resolution and low resolution level modes makes it possible to properly change the resolution of inclination to a level the user requires as well as to eliminate necessity for the user to set the level mode. Accordingly, it is possible to adjust the posture of the imaging apparatus 10 easily in a short time irrespective of a held state and/or a fixed state of the apparatus.

The present embodiment in which the high and low resolution level modes are automatically switched over each other is configured that the alarm sound is issued in the low resolution level mode as in the first embodiment. How to notify a user, for example, with the alarm sound or the inclination indicator, is arbitrarily settable. Therefore, the first embodiment in which the level mode setting is manually done can be configured to notify the inclination with the inclination display only in the low resolution level mode. Also, it can be configured to allow the user to select either of the alarm sound and the inclination indicator.

Further, in the low resolution level mode, the user is notified of the inclination over the predetermined value by the alarm sound (S12). However, it can be configured to notify it to the user with the inclination indicator on the display unit 17.

Fourth Embodiment

Figure 5:
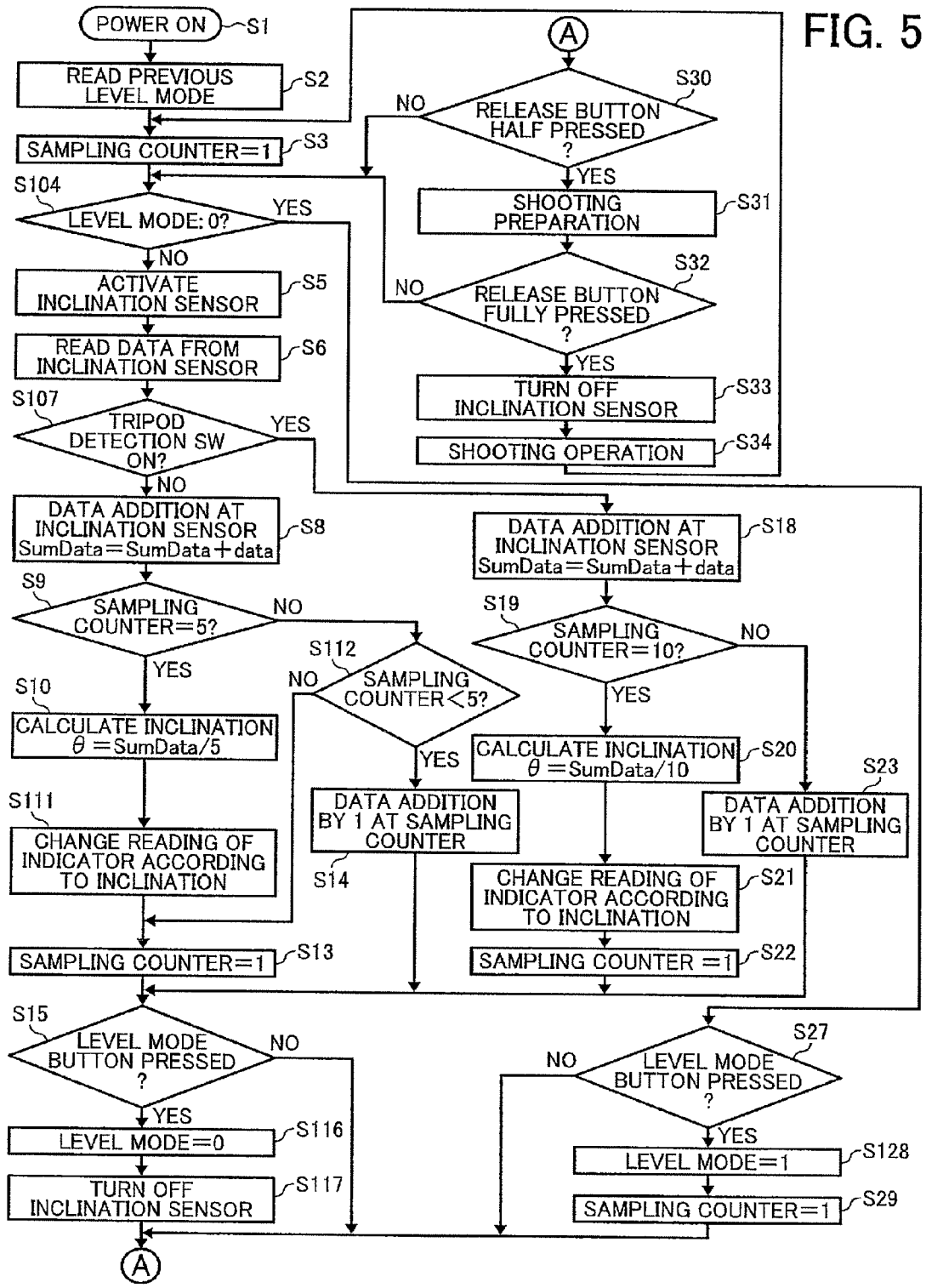
FIG. 5 is a flowchart for operation of an imaging apparatus according to the second embodiment of the present invention.
Figure 9:
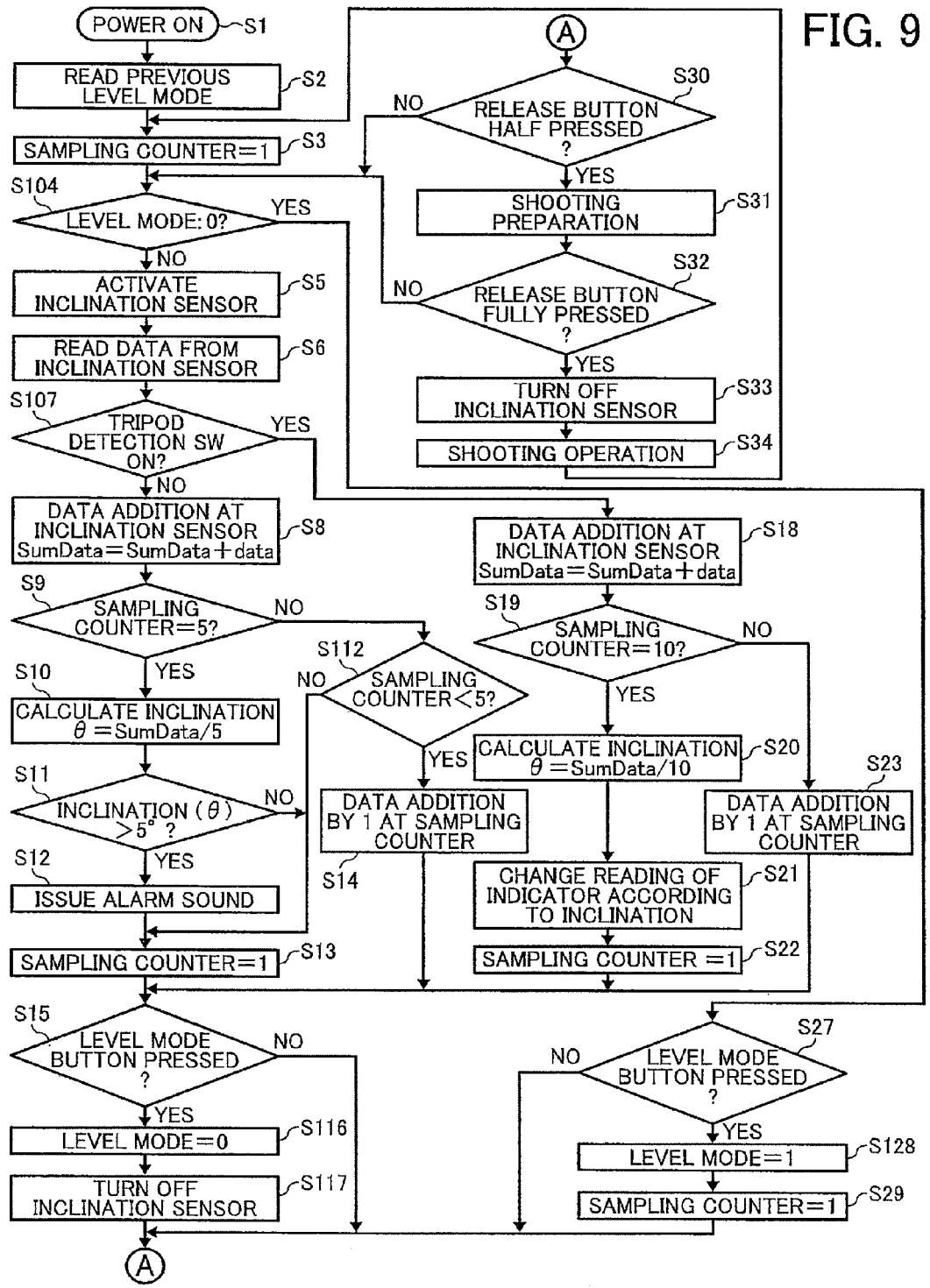
FIG. 9 is a flowchart for operation of an imaging apparatus according to the third embodiment of the present invention.
Figure 10A:
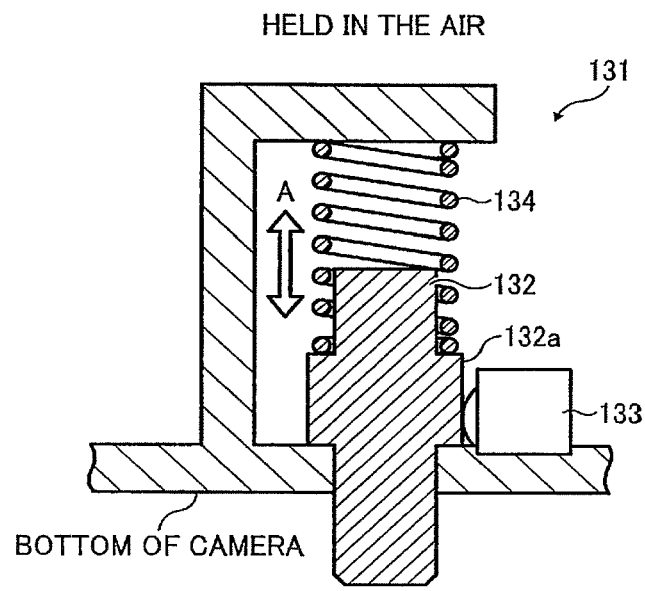
FIGS. 10A, 10B show an opposing object detector of an imaging apparatus according to the fourth embodiment of the present invention.
Figure 10B:
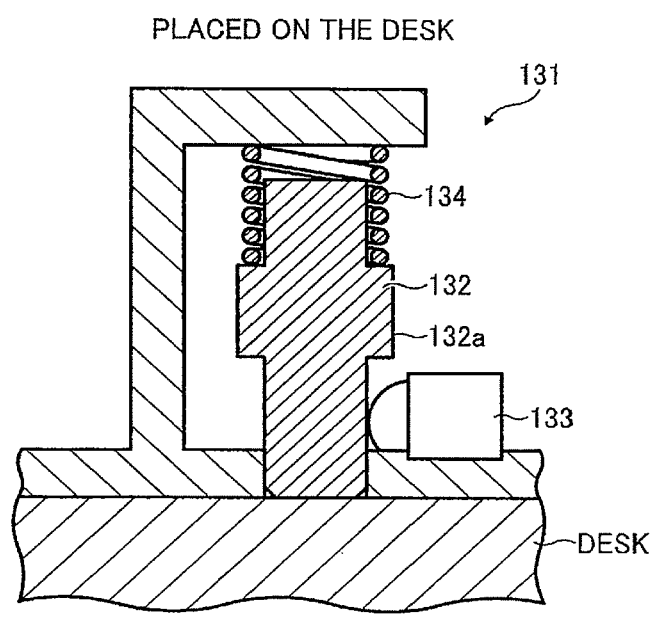

The present embodiment concerns automatic setting of the high resolution level mode when the imaging apparatus 10 is placed on a desk or is firmly held with both hands of the user, in replace of when the tripod is detected in the second and third embodiments (in S107 in FIGS. 5, 9). The operational flow of the present embodiment is the same as in that in FIG. 5 except that in S107 detection is made on whether or not the imaging apparatus 10 is placed on a desk or firmly held by the user.

FIGS. 10A, 10B, 11A, 11B show examples of detection of the imaging apparatus 10 on a desk. The imaging apparatus 10 in FIG. 10 comprises a mechanism for determining whether or not an object is in contact with the bottom surface of the apparatus, which is similar to one for detection of the tripod (FIG. 7A, 7B). That is, an opposing object detector 131 comprises an opposing object sensor 132 and an opposing object detection switch 133 determining whether or not the imaging apparatus 10 is placed on the desk. The opposing object sensor 132 is biased by a spring 134 to protrude towards the bottom portion of the imaging apparatus 10 while it is not placed on the desk. At the same time, a protrusion 132a of the opposing object sensor 132 pushes the opposing object detection switch 133.

When the imaging apparatus 10 is placed on the desk, the opposing object sensor 132 is contained in the imaging apparatus 10, thereby releasing the pressure to the opposing object detection switch 133 from the protrusion 132a to detect the apparatus 10 being placed on the desk.

Figure 11A:
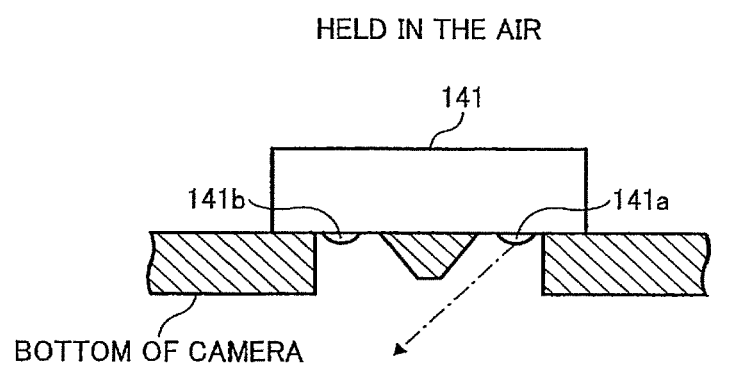
FIGS. 11A, 11B show another opposing object detector of the imaging apparatus according to the fourth embodiment of the present invention.
Figure 11B:
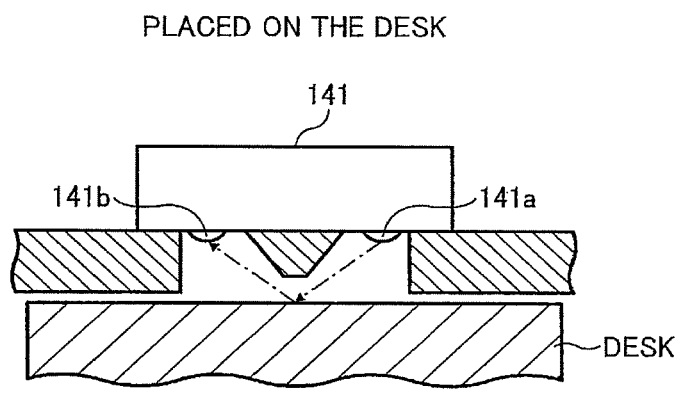

FIGS. 11A, 11B show an example of optically determining whether or not an object is in contact with the bottom surface of the apparatus 10. The imaging apparatus 10 comprises a photo reflector 141 on the bottom. In FIG. 11B, with the imaging apparatus 10 on the desk, light from a light emitting portion 141a is reflected by the desk surface, and the reflected light is incident on a light receiving portion 141b. Thereby, the imaging apparatus 10 being placed on the desk is detected. This mechanism does not need a movable mechanical member so that mechanical failure or the like does not have to be concerned much. However, it has a problem that detection accuracy depends on the reflectivity of the desk surface.

Figures 12, 13A:
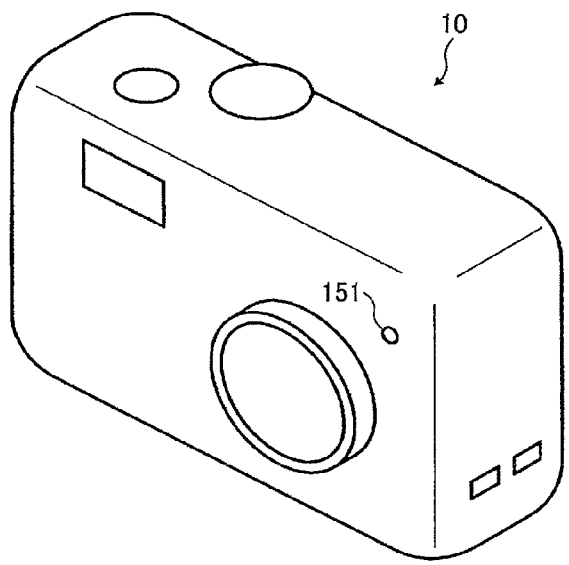
FIG. 12 shows a left-hand detector of the imaging apparatus according to the fourth embodiment.
FIG. 13A shows a level mode setting of an imaging apparatus according to the fifth embodiment.

FIG. 12 shows an example of detecting that the apparatus 10 is firmly held with hands. The imaging apparatus comprises a hand detection sensor 151. In general, a shutter button is disposed on the upper left of the imaging apparatus 10, seen from the front side, and manipulated with the right hand of the user. In other words, the user generally holds the apparatus 10 at least with his/her right hand. Because of this, for the purpose of determining whether or not the apparatus is held with both hands of the user, the hand detection sensor is provided on the upper left of the front surface of the apparatus.

The hand detection sensor 151 can be a mechanical sensor comprising a spring, an opposing object sensor, and an opposing object detection switch as shown in FIG. 10. Alternatively, it can be a photo reflector as shown in FIG. 11, a pressure sensor for detecting pressure from the hand holding the apparatus, or a thermal sensor for detecting body temperature.

In order to prevent erroneous detection of the hand-held state when the user is handling the imaging apparatus 10, in actual operation the hand detection is preferably configured in such a manner that the hand held state of the imaging apparatus 10 is determined when the detection continues over a certain period of time.

In addition, in replace of such physical sensors, the imaging apparatus 10 can be configured to detect vibration applied to the apparatus for determining a hand-held state or a fixed state. For example, the system controller 20 can determine the hand-held state or fixed state of the apparatus 10 according to output from the inclination sensor 25. Specifically, it decides that the apparatus is fixed on the tripod or firmly held with the hands of the user when the output from the inclination sensor 25 does not vary or variation in the output is small in a predetermined period. Then, the apparatus 10 is set to the high resolution level mode.

Furthermore, it is possible to determine the hand-held state or fixed state by use of a shake sensor (acceleration sensor) which is incorporated in most of present imaging apparatuses. For example, it can be configured that the system controller 20 decides that the apparatus is fixed on the tripod or firmly held with the hands of the user when an amount of shake detected by the shake sensor is smaller than a predetermined amount. Then, the apparatus 10 is set to the high resolution level mode.

It is unnecessary to provide a new dedicated sensor for detecting the vibration, achieving space saving and manufacture cost-down. However, in case of using the inclination sensor 25 and hand shake sensor, erroneous determination may occur when the output values thereof is near the reference values, for example, when the apparatus is firmly held by the hands of the user but it is not completely in a still state, since the output values are compared with the predetermined reference values to determine the state of the apparatus, unlike the tripod detector 121, opposing object detector 131, photo reflector 141, and hand detection sensor 151 each turning on and off to detect the hand-held or fixed state. In order to prevent this from happening, it is preferable to allow the user to select the reference value.

As described above, according to the present embodiment, it is possible to adjust the posture of the imaging apparatus 10 easily in a short time irrespective of the state of the apparatus 10, held or fixed, without using additional cost or space since the existing sensors (inclination sensor, shake sensor) therein function to determine the hand-held state or not.

Further, when holding the imaging apparatus 10 with both hands, generally, the user firmly holds it with intention to shoot. In the present embodiment, the imaging apparatus 10 is automatically shifted to the high resolution level mode upon the detection of the hand-held state (held with a left hand) by the hand detection sensor 151, thereby making it more accurate and easier to adjust the posture of the imaging apparatus 10.

Further, the imaging apparatus 10 is configured to determine that it is held with the hands when the detection of the left hand continues over a certain period of time. This prevents erroneous level-mode setting due to the user's shifting the apparatus from one hand to the other or the like. As a result, stable automatic level mode setting is achievable.

Fifth Embodiment

The imaging apparatus 10 according to the fifth embodiment is different from that according to the above-mentioned embodiments in that it executes both of the high resolution and low resolution level modes together and not that it executes them selectively.

That is, according to the present embodiment, for notifying the user of the degree of inclination of the imaging apparatus 10 with a high resolution, the notification is made visually on the display unit while for notifying the same with a low resolution, the notification is made auditorily with the alarm sound such as beep sound. In such a manner, it is possible to operate both of the high and low resolution level modes at the same time without the need for a special mode switching operation, and issue the alarm sound or display the inclination indicator with a proper resolution without bothering the user to switch the level mode.

When largely inclined, the imaging apparatus 10 issues the alarm sound to notify the user of the large inclination, while when slightly inclined, it displays the amount and/or direction of inclination on the screen to allow the user to make fine adjustment. The present embodiment uses both of the visual and auditory notification methods, however, it is not limited thereto. As long as the large and small inclinations are distinctive, other methods besides the combination of visual display and audio are applicable.

Figure 13B:
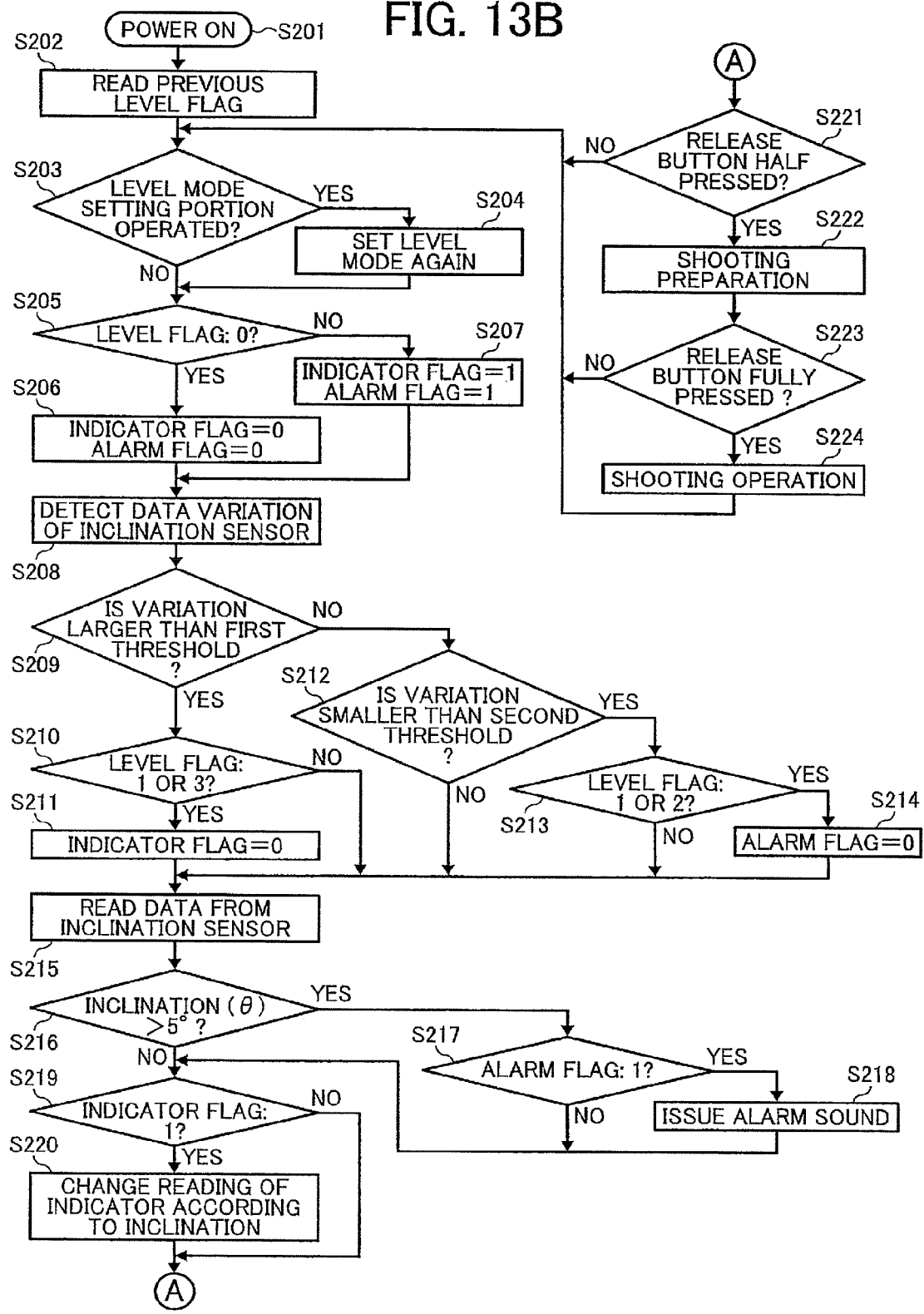
FIG. 13B is a flowchart for operation thereof in the level mode.

The present embodiment will be described with reference to FIGS. 13A, 13B. FIG. 13A shows level modes and types of notification, and FIG. 13B is a flowchart for operation according to the present embodiment. The imaging apparatus 10 according to the present embodiment comprises five level modes, OFF, AUTO, indicator ON, alarm ON, and enforced ON modes, as shown in FIG. 13A. The notification at the high resolution is made by inclination indicator while that at the low resolution is made via the alarm sound.

In the OFF mode (flag=0) both of the inclination indicator and the alarm sound are set to OFF. In the AUTO mode (flag=1) both of the inclination indicator and the alarm sound are generally set to ON, however, under a certain condition either or both of them are set to ON. The certain condition will be described in detail later. In the indicator ON mode (flag=2) the inclination indicator is always set to ON and the alarm sound is generally set to ON, however, under a certain condition the alarm sound is set to OFF. In the alarm ON mode (flag=3) the inclination indicator is generally set to ON and the alarm sound is always set to ON, however under a certain condition the inclination indicator is set to OFF. In the enforced ON mode (flag=4) both of the inclination indicator and alarm sound are always set to ON.

Besides the above modes, other level modes such as one in which the inclination indicator is always set to ON and the alarm sound is always set to OFF are feasible. Further, the intermediate modes as the indicator ON (flag=2) and alarm ON modes (flag=3) can be excluded to simplify the level mode configuration.

Next, with reference to FIG. 13B, operation of the present embodiment will be described. Upon power-on of the imaging apparatus (S201), a previously set level mode is read for initial setting in S202. Then, whether or not the user manipulates a level mode setting portion is determined in S203. With the manipulation determined, the level mode is set according to the user's manipulation in S204. In S203 and S204, how to set the level mode can be arbitrary, and it can be set via a mode switch button as in the first embodiment, for example.

In S205 whether or not the set level mode is the OFF mode (flag=0) is determined. With the OFF mode set, both of the inclination indicator and alarm sound (both of flags=0) are set to OFF in S206. With any of the other level modes set (flag=1 to 4), both of the inclination indicator and alarm sound are set to ON (both of flags=1) in S207. According to the present embodiment, both of the inclination indicator and alarm sound are set to ON by default, except for the OFF mode.

In S208 to S214, either of the inclination indicator and alarm sound is set to OFF under predetermined conditions. In accordance with variation in outputs of the inclination sensor 25, the system controller 20 determines stability of posture of the imaging apparatus 10. While the apparatus 10 is in a stable position spatially (fixed state such as placed on a desk), it sets the alarm sound to OFF (flag=0). While the apparatus 10 is in an unstable position spatially (manually held by a moving user), it sets the inclination indicator to OFF (flag=0).

Specifically, the system controller 20 detects data variation of the inclination sensor 25 in a unit time (S208), and determines that the posture of the imaging apparatus 10 is spatially unstable when the detected result is larger than a first threshold value (Yes in S209).

In the AUTO mode (flag=1) or alarm ON mode (flag=3) (Yes in S210), the inclination indicator set to ON is changed to OFF. Thus, the user is notified of the inclination of the imaging apparatus 10 only via the alarm sound without the inclination indicator when the posture of the imaging apparatus 10 is spatially unstable during either the AUTO mode or the alarm ON mode. Neither in the AUTO mode nor in the alarm ON mode (No in S210), setting of the inclination indicator and the alarm sound is unchanged, proceeding to the next step.

Meanwhile, when the data variation is smaller than the first threshold value (Yes in S209), the system controller 20 compares it with a predetermined second threshold value (S212). With the data variation being larger than the second threshold value (No in S212), the system controller 20 cannot determine whether the posture of the imaging apparatus is stable or not so that it does not change the setting of the inclination indicator and the alarm sound, proceeding to the next step.

In another case where the data variation is smaller than the first threshold value (No in S209) and than the second threshold value (Yes in S212) neither in AUTO mode (flag=1) nor indicator ON mode (flag=2) (No in S213), the system controller 20 does not change the setting of the inclination indicator and the alarm sound either.

In either AUTO mode (flag=1) or indicator ON mode (flag=2) (Yes in S213), it determines that the posture of the imaging apparatus 10 is spatially stable (fixed), and changes the set alarm sound ON to OFF (S214). While the imaging apparatus 10 is in a spatially stable position, the issuance of the alarm sound is unnecessary and the user is notified of the degree of inclination of the imaging apparatus via the inclination indicator on the display unit only.

In the present embodiment variation in the outputs of the inclination sensor 25 is determined based on the two threshold values for the purpose of preventing erroneous indication of the inclination or erroneous issuance of the alarm sound due to erroneous determination on the spatial stability of the imaging apparatus 10. An undetermined range of values is set between the two threshold values, in which the spatial stability of the imaging apparatus 10 is undetermined. While the data variation is in the undetermined range, the default setting (S207) of the level mode is maintained.

In the present embodiment, the stability of the imaging apparatus 10 is determined according to the variation in outputs of the inclination sensor 25, however, data from the tripod detector 121, the opposing object detector 131, or else can be also used as in the second to fourth embodiments.

Through the steps above, the setting of the inclination indicator and alarm sound according to the data variation of the inclination sensor 25 is completed. The operation proceeds to steps S215 to S220 in which the inclination indicator is displayed or the alarm sound is issued.

In S215 data (Data) is read from the inclination sensor 25. When the read data is over a predetermined inclination degree (Yes in S216) and the alarm ON (flag=1) is set (Yes in S217), the alarm sound is issued in S218. Then, a decision is made on whether or not the inclination indicator is to be displayed in S219. In the alarm sound OFF (No in S217), without issuance of the alarm sound, display or non-display of the inclination indicator is determined in S219.

In the inclination indicator ON (flag=1) (Yes in S219), resolution of the inclination indicator on the display unit is changed in accordance with the degree of inclination detected (S220, FIG. 4). In the inclination indicator OFF (No in S219), the inclination indicator is not displayed.

Lastly, upon determining the state of the release button in S221 to S224, necessary operation is executed, then returning to S203.

In the present embodiment, the degree of inclination is determined according to a single data sampling from the inclination sensor 25 in S215, S216. However, as in the first embodiment (S9 to S11, S19 to S21) it can be determined according to a plural data samplings therefrom.

As described above, with use of the inclination indicator and the alarm sound, it is possible to notify the user of the degree of inclination of the imaging apparatus 10 properly with the two tiers, the alarm and indicator, without bothering the user to switch the level mode.

Further, it is made possible for the user to surely recognize the inclination of the imaging apparatus 10 with the alarm sound if the imaging apparatus 10 is greatly inclined. For a small inclination the inclination indicator is displayed in replace of the alarm sound. The alarm sound is effective to notify the user of an inclined imaging apparatus 10; however, it can be annoying when the user does not need it. Therefore, the imaging apparatus 10 according to the present embodiment is configured to issue the alarm sound for warning a large inclination and display the inclination indicator for adjusting a small inclination, thereby providing a useful system of notifying the degree of inclination.

Further, the alarm sound and the inclination indicator can be settable arbitrarily and independently so that the user is able to select it as he/she wants.

The system controller 20 automatically determines which one of the inclination indicator and the alarm sound is to operate, eliminating necessity for the user to switch them and allowing the user to perform shooting operation smoothly without interruption.

Sixth Embodiment

Figure 14B:
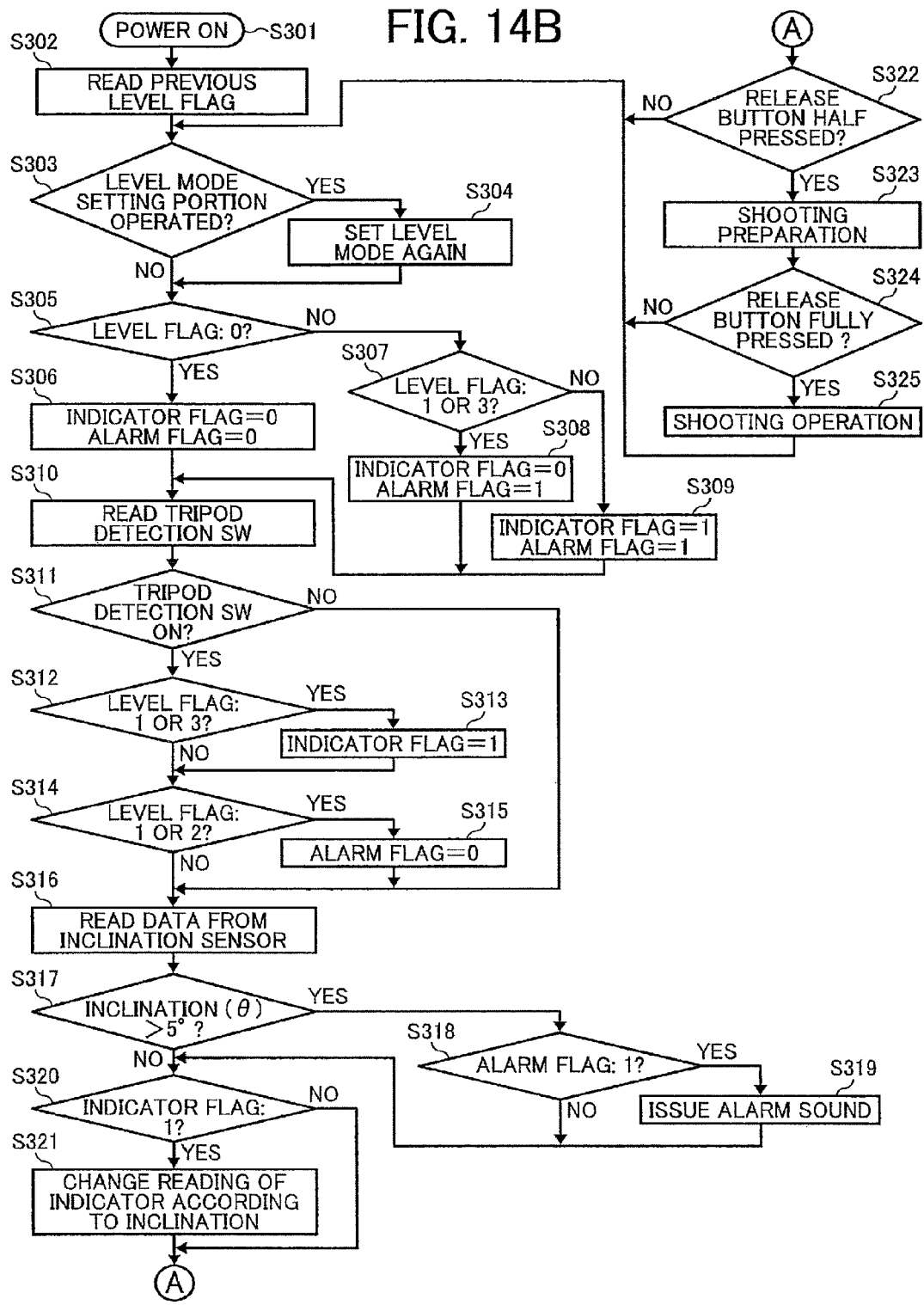
FIG. 14B is a flowchart for operation thereof in the level mode.

The sixth embodiment of the present embodiment will be described with reference to FIGS. 14A, 14B. FIG. 14A shows level modes and types of notification, and FIG. 14B is a flowchart for operation according to the present embodiment. In the present embodiment the inclination indicator can be set to OFF unless it is necessary, for consideration for a user who feels that the inclination indicator on the display is visually annoying. In replace of the inclination sensor 25 in the fifth embodiment, the tripod detector 121 is used for determining stability of the spatial posture of the imaging apparatus 10.

Displaying the inclination indicator or not and using either the inclination sensor 25 or the tripod detector 121 for detection of stability of the imaging apparatus are irrelevant from each other. According to the fifth embodiment, the postural stability of the imaging apparatus 10 is determined according to data output from the inclination sensor 25 during the indicator generally ON. According to the sixth embodiment, that is determined according to data output from the tripod detector 121 during the indicator generally OFF. However, that can be determined according to data output from the tripod detector in the indicator generally ON.

The level modes in the present embodiment are different from those in the fifth embodiment in the AUTO mode (flag=1) and the alarm ON mode (flag=3), as shown in FIG. 14A. In the AUTO mode the inclination indicator is set to OFF and the alarm sound is set to ON generally, but under a certain condition the former is set to ON and the latter is set to OFF. The certain condition will be described later. In the alarm ON mode the inclination indicator is generally set to OFF and the alarm sound is always set to ON, but under a certain condition the former is set to ON.

Next, the operation of the present embodiment will be described with reference to FIG. 14B. Steps S301 to S306 are the same as those S201 to S206 in FIG. 13B so that a description thereon will be omitted.

When any of the level modes other than the OFF mode is set (flag=1 to 4) (No in S305), the set level mode is determined in S307. With the AUTO or alarm ON (flag=1 or 3) set (Yes in S307), the inclination indicator is set to OFF (flag=0), and the alarm sound is set to ON (flag=1) in S308. This is a default setting for the AUTO or alarm ON mode.

With the indicator ON or enforced ON mode set (No in S307), both of the inclination indicator and the alarm sound are set to ON (both flags=1), which is a default setting for the two modes.

Next, in S310 to S315 the above default settings are changed under predetermined conditions. According to the tripod detector 121's detection or non-detection of the tripod, the postural stability of the imaging apparatus 10 is determined. With the tripod detected, the inclination indicator is displayed without issuance of the alarm sound. The tripod detector 121 can only detect presence or absence of the tripod, therefore, the undetermined range in the fifth embodiment is not set in the present embodiment.

Upon the tripod detector 121's detection of the tripod (Yes in S311) in the AUTO mode or alarm ON mode (Yes in S312), the inclination indicator is set to ON (flag=1) because the posture of the imaging apparatus 10 is spatially stable. Also, the issuance of the alarm sound is not effective in this case so that the alarm sound is set to OFF (flag=0) in the AUTO mode or indicator ON mode (Yes in S314). Steps S316 to S325 are the same as those S215 to S224 in FIG. 13B, therefore, a description thereon will be omitted.

In the present embodiment, the degree of inclination is determined according to a single data sampling from the inclination sensor 25 in S316, S317. However, as in the first embodiment (S9 to S11, S19 to S21 in FIG. 3) it can be determined according to plural data samplings therefrom.

As described above, with use of the inclination indicator and the alarm sound, it is possible to notify the user of the degree of inclination of the imaging apparatus 10 properly with the two tiers, alarm and indicator, without bothering the user to switch the level mode.

In the above embodiments, the postural stable state of the imaging apparatus 10 refers to a substantially fixed state. In placing the imaging apparatus 10 in a stable position, the user is likely to make fine adjustment of the posture of the apparatus. In view of improving usability of the apparatus for the user, the imaging apparatus 10 is configured to automatically set the inclination indicator to ON and the alarm sound to OFF. For example, in a case where at shooting the user intentionally inclines the imaging apparatus 10 but holds it firmly, or where the imaging apparatus 10 is disposed on an inclined place or object, the system controller 20 controls the audio unit 24 to stop the alarm sound. When the imaging apparatus 10 is mounted on a tripod, the system controller 20 controls the display unit 17 to automatically display the inclination indicator.

Note that the inclination sensor 25 is equivalent to the inclination detector, the system controller 20 and display unit 17 are equivalent to the first inclination indicator unit, and the system controller 20 and audio unit 24 are equivalent to the second inclination indicator unit. Further, the system controller 20 is equivalent to the selector unit, the hand shake sensor is equivalent to the shake amount detector, and the tripod detector, opposing object detector 131, photo reflector 141, and left hand detector 151 are equivalent to the stability detector.

Now, the following embodiments will describe how to display the inclination indicator of the imaging apparatus without visually annoying the user.

Seventh Embodiment

Figure 15:
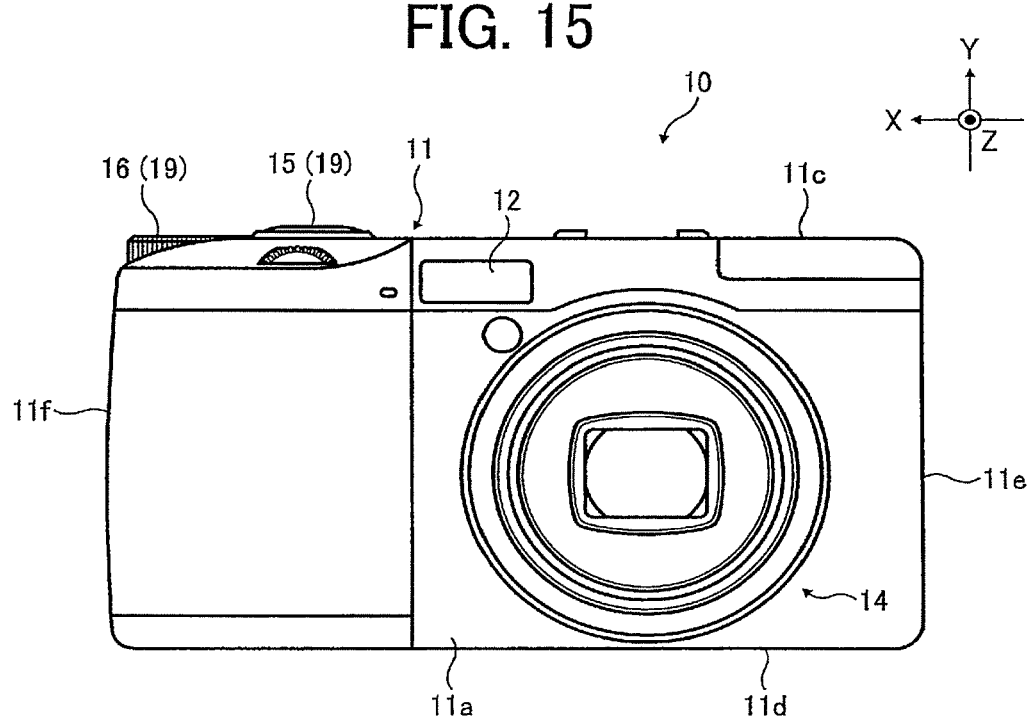
FIG. 15 is a front view of an imaging apparatus according to the seventh embodiment of the present invention.
Figure 16:
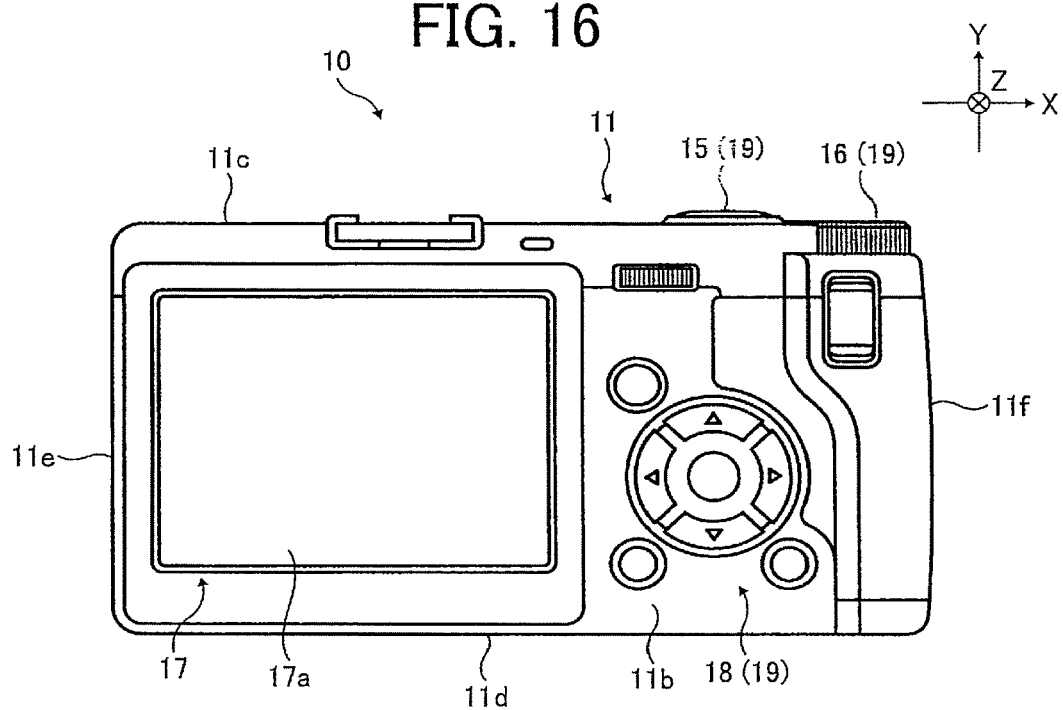
FIG. 16 is a back view of the imaging apparatus 10 according to the seventh embodiment.
Figure 17:
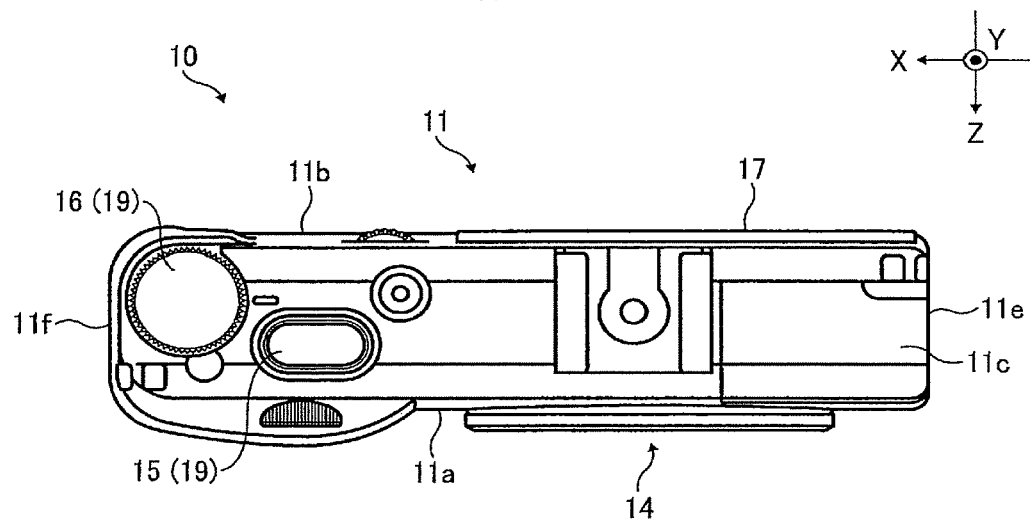
FIG. 17 is a plain view of the imaging apparatus 10 according to the seventh embodiment.
Figure 18:
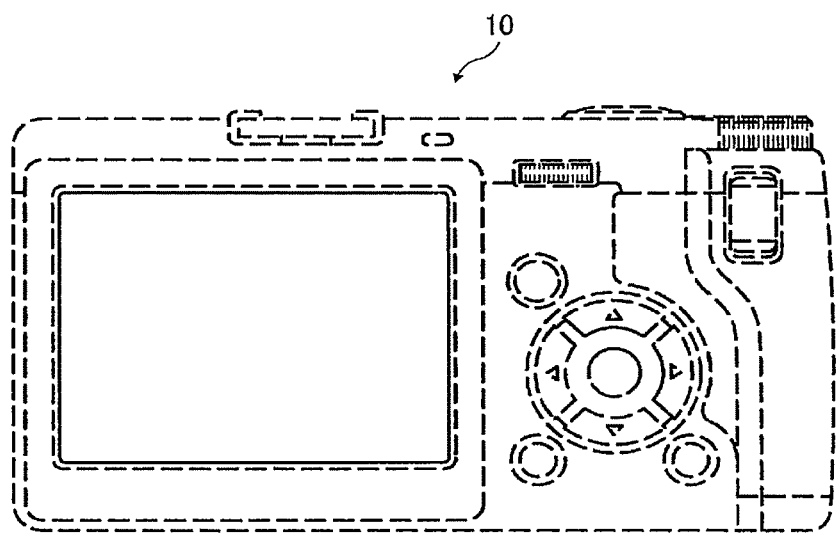
FIG. 18 is a back view of the imaging apparatus 10 according to the seventh embodiment.
Figure 19:
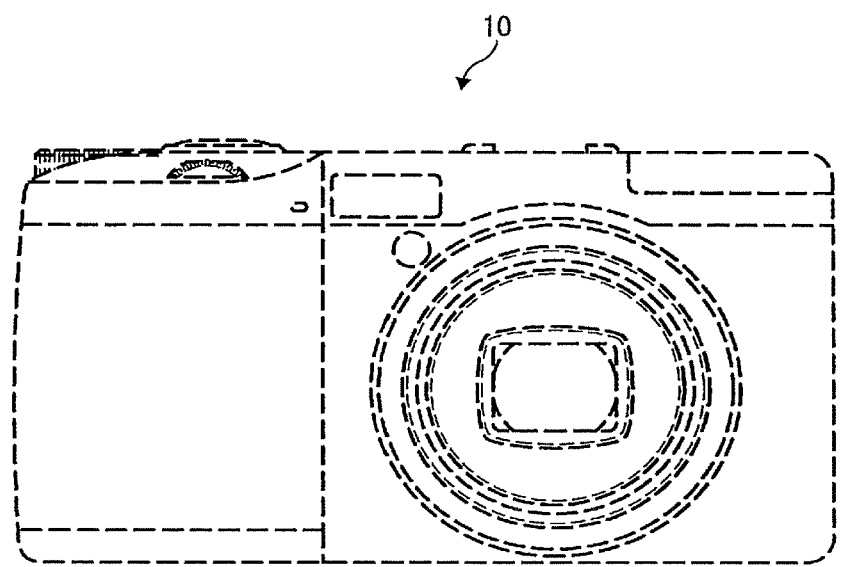
FIG. 19 is a front view of the imaging apparatus 10 according to the seventh embodiment.
Figure 20:
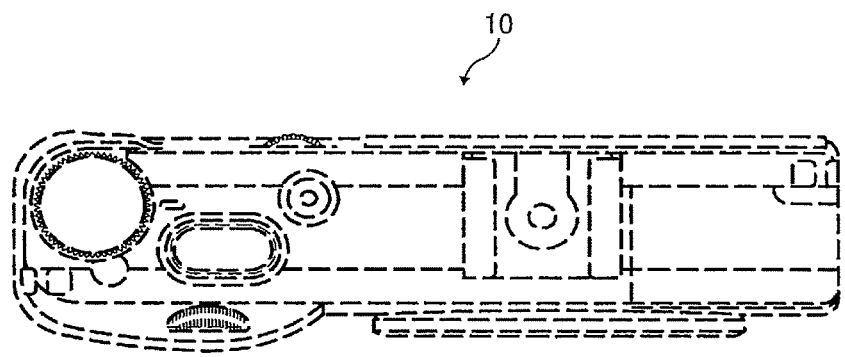
FIG. 20 is a plain view of the imaging apparatus 10 according to the seventh embodiment.
Figure 21:
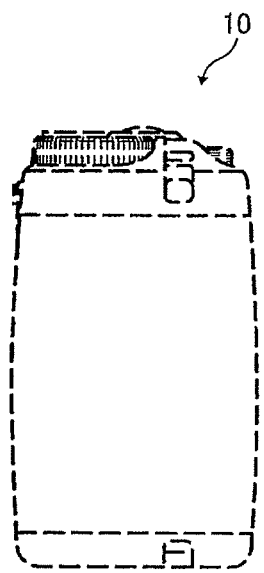
FIG. 21 is a right side view of the imaging apparatus 10 according to the seventh embodiment.
Figure 22:
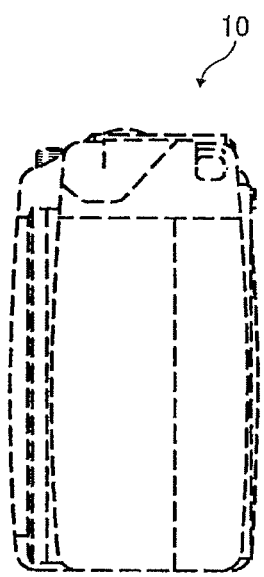
FIG. 22 is a left side view of the imaging apparatus 10 according to the seventh embodiment.
Figure 23:
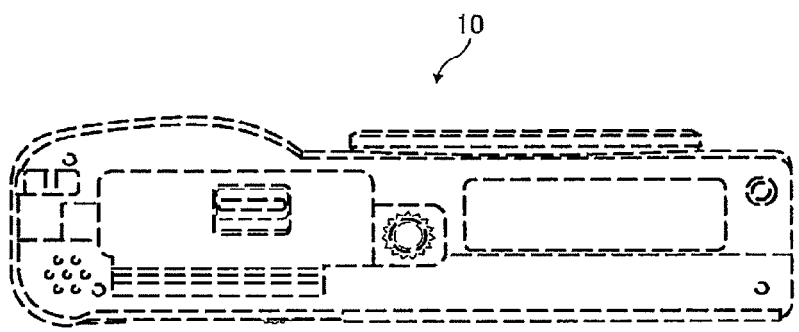
FIG. 23 is a bottom view of the imaging apparatus 10 according to the seventh embodiment.

FIGS. 15 to 17 show another imaging apparatus 10 according to the present invention. FIG. 15 shows a front view, FIG. 16 is a back view, and FIG. 17 is a top view thereof. Hereinafter, an optical axis direction of the imaging apparatus is to be a Z direction, a vertical direction thereof is to be a Y direction, and a direction orthogonal to a Y to Z plane is to be an X direction. FIGS. 18 to 23 are hexagonal views of the imaging apparatus 10 indicated by broken lines. FIG. 18 is a back view thereof, FIG. 19 is a front view, FIG. 20 is a plain view, FIG. 21 is a right side view, FIG. 22 is a left side view and FIG. 23 is a bottom view thereof. In FIG. 18 only the display unit is indicated by solid lines.

The imaging apparatus 10 comprises an outer body case 11 of a rectangular solid shape, a stroboscopic unit 12, a lens barrel unit 14 including a photographic lens on a front surface 11a. A release button 15, a mode dial switch 16 and so on are provided on the top surface 11c of the body case 11.

On the back surface 11b of the body case 11 provided are a display unit 17, a direction indicator switch 18 and the like. The display unit 17 comprises a screen 17a whose vertical and horizontal directions match with X and Y directions respectively, and which is long in X direction to display a captured image P, an operation menu and so on to be described later.

The release button 15, mode dial switch 16, and direction indicator switch 18 constitute an operation unit 19 to be manipulated by a user.

In the imaging apparatus 10, various functions are selectable via the direction indicator switch 18. Upon press to the release button 15, a subject is photographed, and an image of the subject is displayed on the screen 17a of the display unit 17. The outer form of the imaging apparatus 10 is not limited to the one in the above, and can be other forms.

The internal system of the imaging apparatus 10 is the same as that in FIG. 1, therefore, a description thereon will be omitted.

The image capturing device 146 captures an image and the A/D converter 21 and the image processor 22 process the captured image P which is to be displayed on the display unit 17 under the control of the system controller 20. The captured image is inclined on the screen 17a in accordance with an inclination of the body case 11. The system controller 20 determines a degree of inclination of the body case 11 according to an output signal form the inclination sensor 25. It also determines whether the captured image P on the screen 17a has a horizontally long composition whose bottom surface 11d or top surface 11c comes at top or bottom (hereinafter, horizontal image Ps) or a vertically long composition whose left or right side surface 11e, 11f comes at bottom or top (hereinafter, vertical image Pv). It makes such determination for display of inclination indicator I described later.

With reference to FIG. 2, the posture of the imaging apparatus 10 will be described again.

Figure 24:
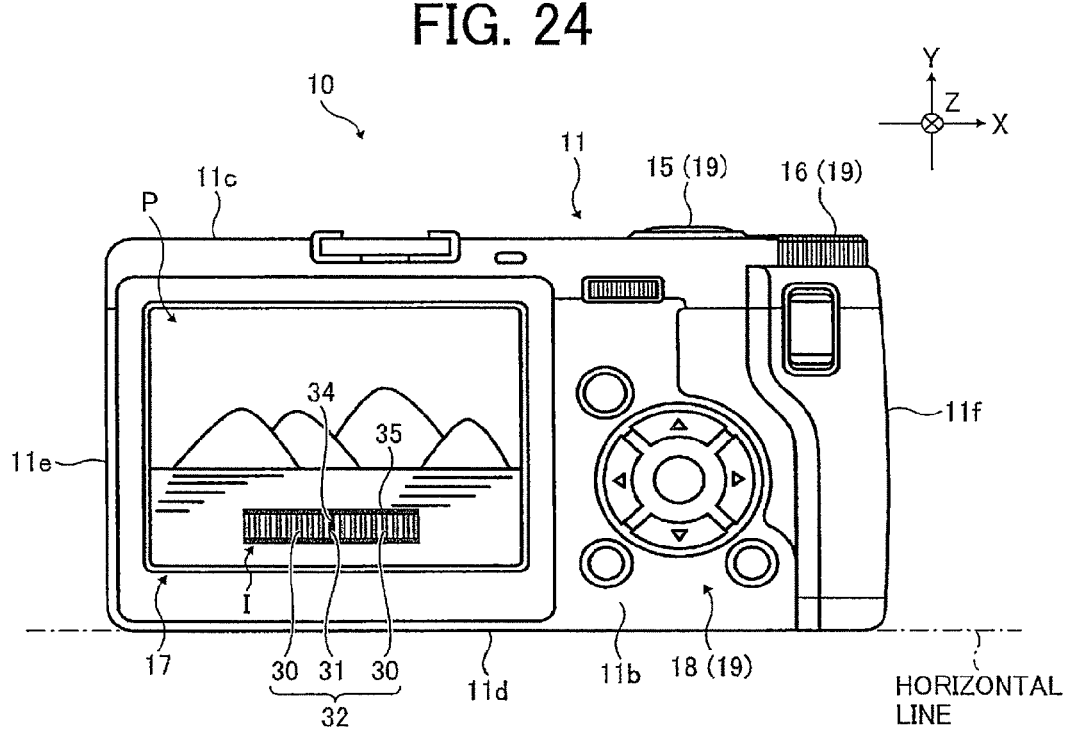
FIG. 24 shows a display unit of the imaging apparatus 10 which displays the posture of the imaging apparatus 10 according to the seventh embodiment.

In the imaging apparatus according to the present invention, the inclination sensor 25 detects an inclination of the body case 11 relative to a direction of gravity around the optical axis direction (Z direction) of the lens barrel unit 14 (hereinafter, roll direction). Specifically, the imaging apparatus 10 is assumed to be placed on a horizontal plane with the bottom surface 11d on the bottom and capture an image. A horizontal direction of the captured image P (horizontal image Ps) is set to be a horizontal criterion. The inclination of the body case 11 is measured from the horizontal criterion, as shown in FIG. 24. Likewise, the imaging apparatus 10 is assumed to be placed on a horizontal plane with the left side surface 11e on the bottom and capture an image. A horizontal direction of the captured image P (vertical image Pv) is set to be a horizontal criterion. The inclination of the body case 11 is measured from the horizontal criterion, as shown in FIG. 25. Accordingly, in the imaging apparatus 10 the horizontal criterion of the horizontal image Ps is to be the X direction while that of the vertical image Pv is to be the Y direction. According to the present embodiment, the frames of the rectangular screen 17a are in the X and Y directions so that the respective horizontal criterions are along the frames thereof.

The present embodiment is configured that the inclination indicator I indicating the degree of inclination detected by the inclination sensor 25 is displayed superimposedly on the captured image P on the screen 17a of the display unit 17, as shown in FIGS. 24, 25. The inclination indicator I functions to assist the user to capture an image without inclination relative to the horizontal plane. The user needs to capture the image without inclination because visual quality of the image may depend on the levelness, for example, when the horizon is in the picture composition such as when food on a dish on the table is captured.

Under the control of the system controller 20, the inclination indicator I is displayed on the screen 17a in parallel with the horizontal criterion. The system controller 20 determines the captured image P as a horizontal image Ps or a vertical image Pv. According to the determination, the inclination indicator I is displayed in X direction (FIG. 24) on the horizontal image Ps while it is displayed in Y direction (FIG. 25) on the vertical image Pv on the screen 17a.

In the following the display of the inclination indicator I on the horizontal image Ps will be described. The horizontal image Ps and vertical image Pv are displayed in the same manner so that a description on a vertical image Pv will be omitted.

Figure 27:
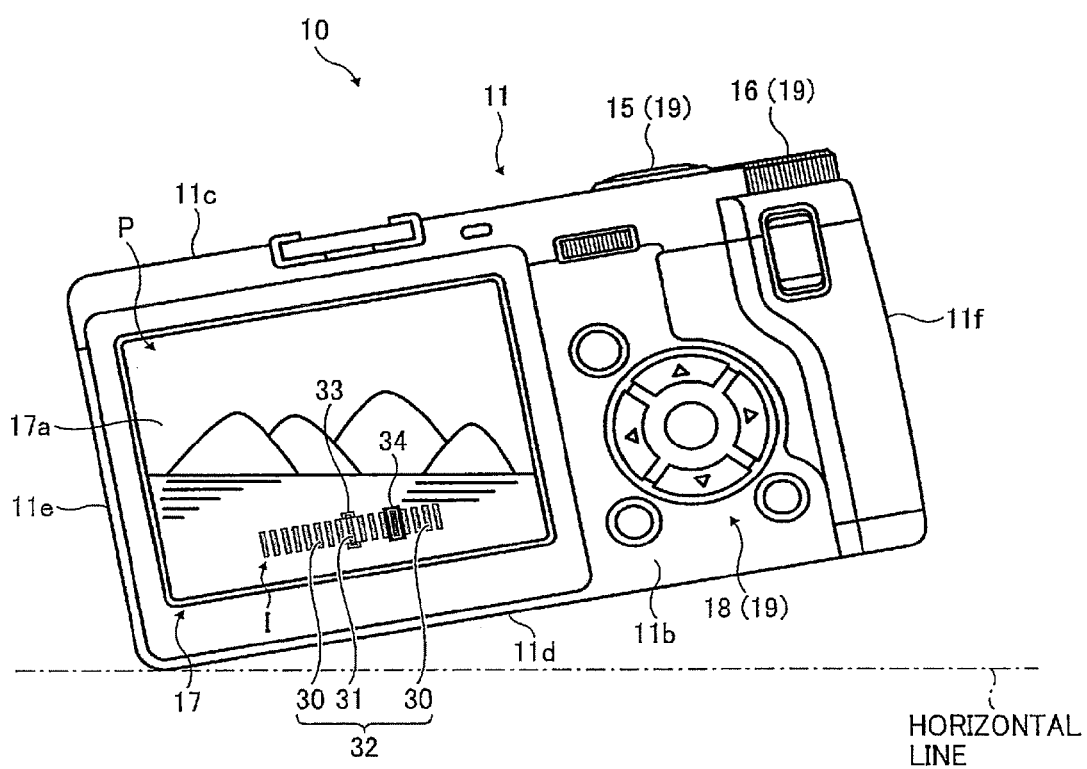
FIG. 27 shows the inclination indicator I on the display unit when the imaging apparatus 10 is in an inclined state according to the seventh embodiment.
Figure 28:
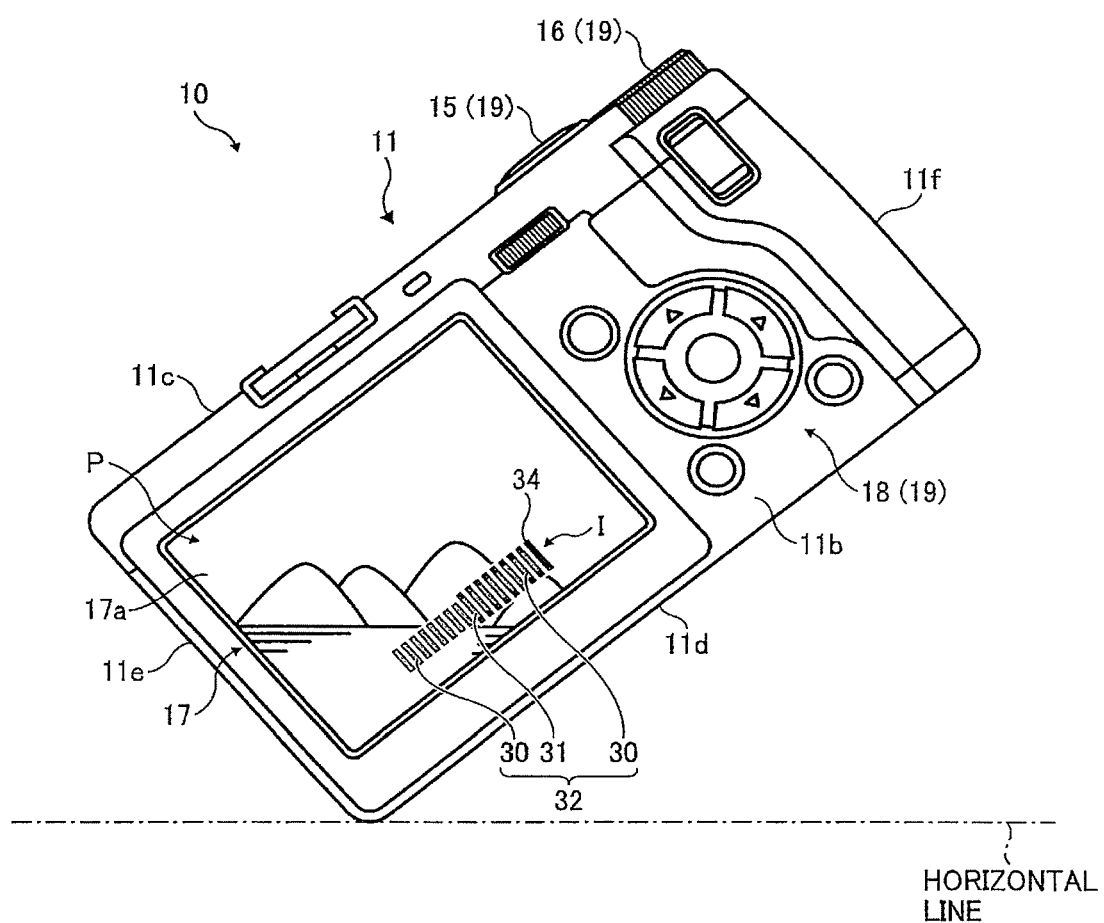
FIG. 28 shows another example of the inclination indicator I when the imaging apparatus 10 is in an inclined state according to the seventh embodiment.
Figure 29:
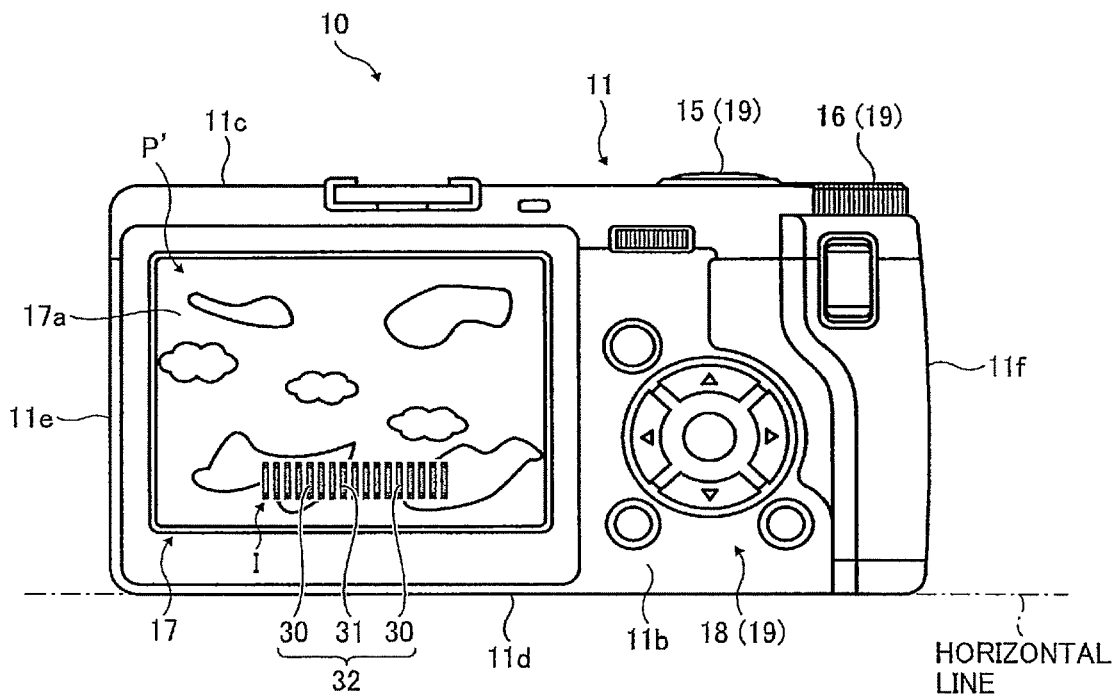
FIG. 29 shows the inclination indicator I of the display unit when the imaging apparatus 10 is extremely turned in a pitch direction according to the seventh embodiment.

FIG. 26 shows the structure of the inclination indicator I, FIG. 27 shows the inclination indicator I when the imaging apparatus 10 is inclined, and FIG. 28 shows the inclination indicator I when the imaging apparatus 10 is extremely inclined. FIG. 29 shows an example of the inclination indicator I when the imaging apparatus 10 is aiming at the sky (when the optical axis thereof is directed to the sky). In FIG. 29 the screen 17a displays the sky as a captured image P'.

The inclination indicator I in FIG. 26 is comprised of a plurality of indicator portions 30 extending in Y direction and arranged with equal interval in X direction (horizontal criterion). The indicator portions have the same size and one of them located at the center in the X direction is set to a center portion 31. The same numbers of indicator portions are arranged in both sides of the center portion 31. The inclination indicator I also includes a target indicator 33 with two portions to be disposed at upper and lower ends of the center portion 31, thereby allowing the user to know the center position at a glance. The plurality of indicator portions 30 arranged are referred to as an inclination display 32.

The inclination display 32 is set to indicate the degree of inclination of the body case 11 in a predetermined range of angles. Specifically, the center portion 31 represents the center as the inclination being zero degree at which the horizontal criterion coincides with the horizontal direction, and the inclination display 32 corresponds to a predetermined range of angles ±α from the center portion. Two of the indicator portions adjacent to the center portion 31 correspond to a range of angles from +α or more to +3α or less as well as to a range of angles from −3α more to −α or less. Another two of them second adjacent to the center portion 31 correspond to a range of angles from one larger than +3α to +5α or less as well as to a range of angles from −5α or more to −3α or less, and the rest of the indicator portions are set similarly. That is, the center portion 31 represents a range of angles 2α from the inclination at zero degree, and the interval of the indicator portions 30 is set to an angle 2α. Each indicator portion and its adjacent portion including the center portion 31 represent consecutive ranges of angles.

The angle α is a value to cancel an inclination of the captured image P with the body case 11 inclined at angle α so that the user sees the captured image P as horizontal. The angle α can be set to an arbitrary value, for example, to 0.5 degrees which is an inclination generally recognizable by users, to 2 degrees which is an inclination where users are likely to wish to correct. It can be set to a proper value with pixel numbers of the imaging apparatus 10 taken into consideration, for example. In the inclination indicator I according to the present embodiment, the range of angles 2α from the center portion 31 represents a horizontal state of the body case 11.

In the present embodiment, the indicator portions 30 have a transparent gray color and the captured image P behind them is visible. The target indicator 33 is white-colored, making the center portion 31 more distinctive. Further, the target indicator 33 is configured not to be displayed while the body case 11 is in a horizontal state, extremely inclined state, and extremely turned state in a pitch direction to be described later.

As shown in FIG. 27, the inclination indicator I indicates the inclination of the body case 11 by highlighting one of the indicator portions representing a current inclination detected by the inclination sensor 25 with an index portion 34. Highlighting with the index portion 34 makes the indicator portion in question more distinct. In accordance with the inclination of the body case 11, the index portion 34 highlights only one of the indicator portions located upward in the Y-axis direction. In FIG. 27, the right side surface 11f is inclined upward in the Y-axis direction, and one of the indicator portions on the right side of the screen 17a is highlighted with the index portion 34.

As above, the index portion 34 is moved along with the inclination of the body case 11. The movement of the index portion 34 is similar to that of air bubble in a bubble level which is generally known for inclination detector, which makes the user feel familiar with the inclination indicator I and makes it easier for the user to read the degree of inclination. In the present embodiment the indicator portions 30 are colored in yellow, and the index portion 34 in black color outlines the indicator portion in question to highlight it. Thus, the highlighted indicator portion in question becomes more distinct.

Moreover, while the body case 11 is in a horizontal state, an H-shaped pattern 35 is displayed in replace of the index portion 34 to indicate the horizontal state. The H-shaped pattern 35 is made of two horizontal lines bridging across the upper edges and lower edges of all the indicator portions 30 in the X direction, respectively and connecting to the center portion 31. In the present embodiment, the two horizontal lines are green-colored, thereby allowing the user to easily know that the body case 11 is in the horizontal state. How to indicate the horizontal state of the body case 11 is not limited to the one described above. Any type of indication is applicable as long as the center portion 31 is highlighted.

Further, when the body case 11 is inclined beyond the range of angles of the inclination display 32, an outermost indicator portion is highlighted with the index portion 34 and at the same time upper and lower edges of indicator portions 30 located at an upward position in the Y-axis direction are highlighted, as shown in FIG. 28. In such a manner, the inclination indicator I indicates extreme inclination. Especially, in the present embodiment the outermost indicator portion and the upper and lower edges of the indicator portions 30 are colored in red, allowing the user to easily recognize that the body case 11 is in the extremely inclined state. How to indicate the extremely inclined state of the body case 11 is not limited to the one described above. Any type of indication is applicable as long as the horizontal state and inclined state are distinguishable.

As shown in FIG. 29, when the body case 11 is turned (inclined) beyond a predetermined angle in the pitch direction (FIG. 2), highlighting the indicator portion 30 with the index portion 34 is stopped. Instead, the upper and lower edges of all the indicator portions 30 including the center portion 31 are highlighted. In such a manner the inclination indicator I indicates extreme turn (inclination) in the pitch direction. Especially, in the present embodiment the upper and lower edges of the indicator portions 30 are colored in red, allowing the user to easily recognize that the body case 11 is in the extremely turned state in the pitch direction.

Here, the predetermined angle refers to a limit angle for the inclination sensor 25 to be able to properly detect an inclination angle in the roll direction, and it is set to be an arbitrary value. By the indication of the extreme turned state in the pitch direction, the user can be notified of an extremely upward or downward position of the body case 11, watching the screen 17a during photo shooting. How to display the extreme turn of the body case 11 is not limited to the one described above. Any type of indication is applicable as long as it is distinguishable from the horizontal state, inclined state and extremely inclined state.

In the present embodiment, when the captured image P is a horizontal image Ps, the inclination indicator I is displayed in the X direction near the bottom of the screen 17a of the display unit 17 as shown in FIG. 24 and FIGS. 26 to 29. Meanwhile, when the captured image P is a vertical image Pv, the inclination indicator I is displayed in the X direction near the left side surface 11e on the screen 17a as shown in FIG. 25.

In a case where the body case 11 is placed on a horizontal plane with the top surface 11c or the left side surface 11f at the bottom, the inclination indicator I is displaced in the X direction on the upper part of the captured image P. In such a case, the inclination indicator I can be also displayed on the lower part of the captured image P.

Figure 30:
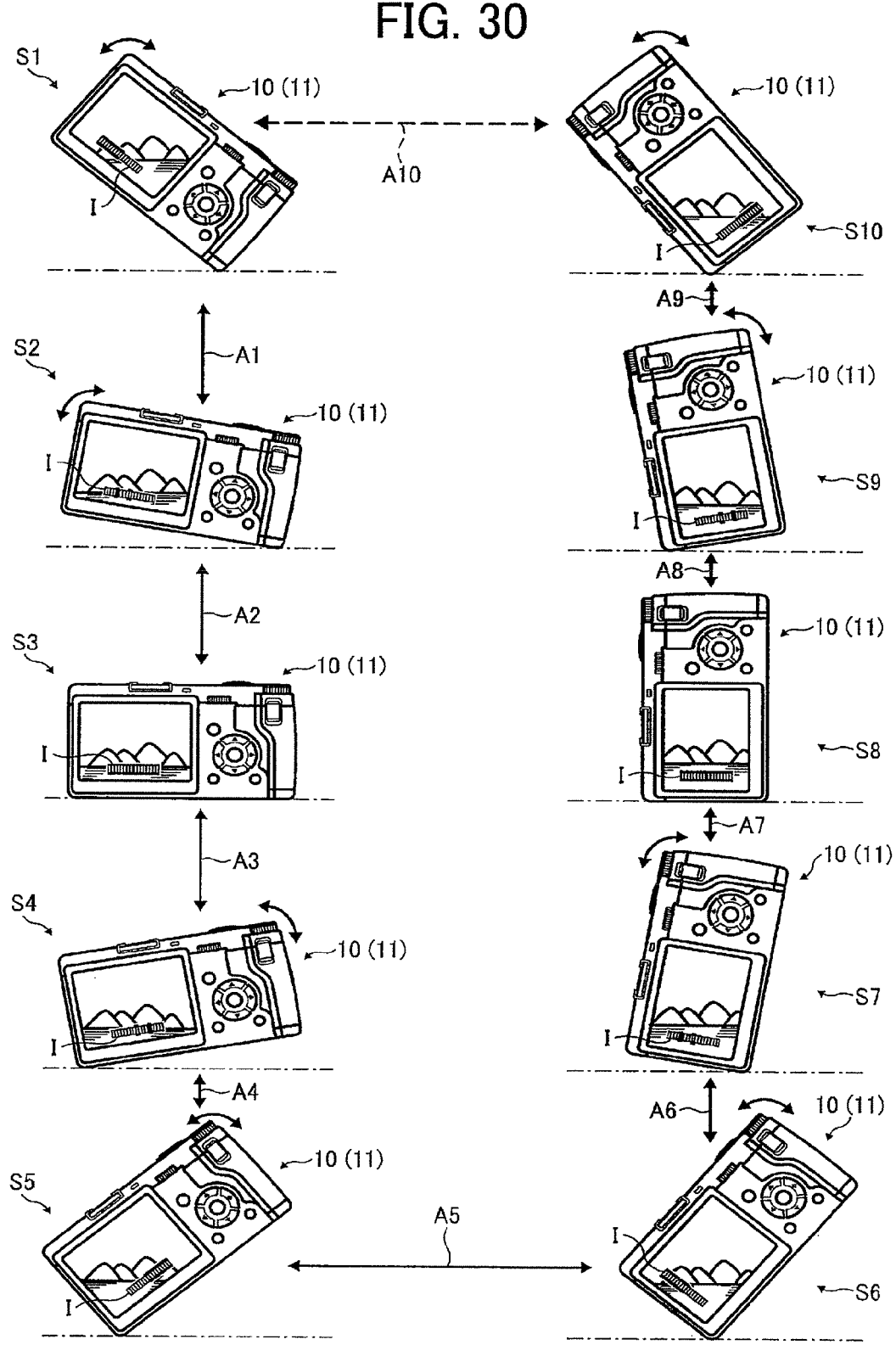
FIG. 30 shows a change in the inclination indicator I while a body case 11 is turned in a roll direction according to the seventh embodiment.

Hereinafter, how the display of the inclination indicator I is changed in accordance with the turn of the body case 11 in the roll direction will be described with reference to FIG. 30.

In capturing a horizontal image Ps, when the body case 11 is inclined so that the left side surface 11e moves upward beyond the set range of angles, the upper and lower edges of the indicator portions 30 on the left side of the center portion 31 are highlighted in red. In such a manner the inclination indicator I indicates the extremely inclined state of the body case 11 (state S1).

Further, in capturing a horizontal image Ps, when the body case 11 is inclined so that the left side surface 11e moves upward within the set range of angles, the indicator portions 30 on the left side of the center portion 31 and corresponding to the inclination angle are displayed in yellow and outlined with the index portion 34 in black. In such a manner the inclination indicator I indicates the degree of inclination of the body case 11 (state S2). The state S2 and state 51 transit to each other (arrow A1).

Similarly, in capturing a horizontal image Ps, when the inclination of the body case 11 is within the range of angles 2α or less and considered to be horizontal, the inclination indicator I heightens the H-shaped pattern in green to indicate the horizontal state (state S3). The state S3 and state S2 transit to each other (arrow A2).

In capturing a horizontal image Ps, when the body case 11 is inclined so that the right side surface 11f moves upward within the set range of angles, the indicator portions 30 located on the right side of the center portion 31 and corresponding to the inclination angle are displayed in yellow and outlined with the black index portion 34. In such a manner the inclination indicator I indicates the degree of inclination (state S4). The state S4 and state S3 transit to each other (arrow A3).

In capturing a horizontal image Ps, when the body case 11 is inclined so that the right side surface 11f moves upward beyond the set range of angles, the upper and lower edges of the indicator portions 30 on the right side of the center portion 31 are highlighted in red. In such a manner the inclination indicator I shows the extremely inclined state of the body case 11 (state S5). The state S5 and S4 transit to each other (arrow A4). When the body case 11 is inclined further upward from the state S5, the horizontal image Ps is changed to a vertical image Pv on the screen 17a of the display unit 17 (state S6).

In capturing a vertical image Pv, when the body case 11 is inclined so that the top surface 11c moves upward beyond the set range of angles, the upper and lower edges of the inclination display 32 on the left side of the center portion 31 are highlighted in red. In such a manner the inclination indicator I indicates the extremely inclined state of the body case 11 (S6). The state S6 and state S5 transit to each other (arrow A5).

Further, in capturing a vertical image Pv, when the body case 11 is inclined so that the top surface 11c moves upward within the set range of angles, the indicator portions 30 on the left side of the center portion 31 and corresponding to the inclination angle are displayed in yellow and outlined with the black index portion 34. In such a manner the inclination indicator I indicates the degree of inclination (state S7). The state S7 and state S6 transit to each other (arrow A6).

Similarly, in capturing a vertical image Pv, when the inclination of the body case 11 is within the range of angles 2α and considered to be horizontal, the inclination indicator I heightens the H-shaped pattern 35 in green to indicate the horizontal state (state S8). The state S8 and state S7 transit to each other (arrow A7).

In capturing a vertical image Pv, when the body case 11 is inclined so that the bottom surface 11d moves upward within the set range of angles, the indicator portions 30 on the right side of the center portion 31 and corresponding to the inclination angle are displayed in yellow and outlined with the black index portion 34. In such a manner the inclination indicator I indicates the degree of inclination (state S9). The state S9 and state S8 transit to each other (arrow A8).

In capturing a vertical image Pv, when the body case 11 is inclined so that the bottom surface 11d moves upward beyond the set range of angles, the upper and lower edges of the indicator portions on the right side of the center portion 31 are highlighted in red. In such a manner the inclination indicator I indicates the extremely inclined state of the body case 11 (state S10). The state S10 and state S9 transit to each other (arrow A9).

For transition from the state S10 to S1 (arrow A10), the body case 11 will be turned almost half in the roll direction. Inverse transition from the state S10 to S1 is the same as transition from the state S1 to S10, therefore, a description thereof will be omitted.

As described above, the imaging apparatus 10 according to the present invention is configured to notify the horizontal state when the degree of inclination is in the range of angles 2α which corresponds to the center portion 31 of the inclination indicator I. This makes it easier for the user to know that the apparatus is in the horizontal state without visual annoyance since the indicator portion in question highlighted with the index portion is preventable from moving without the body case 11 made completely stationary. This is particularly effective in a situation that it is difficult to make the imaging apparatus completely stationary such as when the user holds the imaging apparatus 10 with his/her hands.

The imaging apparatus 10 is configured that in the inclination indicator I the plurality of indicator portions 30 are arranged along the horizontal criterion of the body case 11, and any one of them is highlighted with the index portion 34 in accordance with the degree of inclination. This makes the movement of the index portion 34 appear similarly to movement of an air bubble in a generally known bubble level and accordingly makes the inclination indicator I more familiar and recognizable to the user.

In the imaging apparatus 10 the interval of the indicator portions is set to the predetermined range of angles 2α. Therefore, it is possible to prevent the indicator portion highlighted with the index portion 34 from moving in accordance with fine movement of the body case 11. This makes easier for the user to know that the apparatus is in the horizontal state without visual annoyance. This is particularly effective in a situation that it is difficult to make the imaging apparatus completely stationary such as when the user holds the imaging apparatus 10 with his/her hands.

Further, all the indicator portions have the same size and are arranged with an equal interval. This enable for the user to smoothly and easily adjust the posture of the imaging apparatus 10 because the movement of the index portion follows movement of the body case 11 which the user is handling.

Moreover, the imaging apparatus 10 can notify the four levels of inclination, horizontal state, inclined state, extremely inclined state, and extremely turned state in the pitch direction, in different manners and colors. Therefore, the user can easily distinguish the states of inclination of the imaging apparatus 10 and know in which state, horizontal or inclined, the apparatus is.

As described above, the imaging apparatus 10 according to the present embodiment makes it possible for the user to adjust the posture of the apparatus 10 and easily capture images without unintended inclination and without visual annoyance.

In the present embodiment the horizontal state of the apparatus is notified via the inclination indicator I on the display unit. However, the present invention is not limited thereto. It can be notified via the alarm sound from the audio unit 24 in addition to the inclination indicator I as in the first to sixth embodiments.

Further in the present embodiment, the index portion 34 and the indicator portion 30 in question are displayed in different colors for highlighting the indicator portion 30 as a way of example. However, the present invention is not limited thereto. As long as the indicator portion indicating the current inclination of the body case is distinguishable, contrast or brightness thereof can be differentiated.

Types of the inclination indicator I according to the present embodiment will be shown in FIGS. 31 to 38. In FIGS. 31 to 38 the display unit 17 (screen 17a) and the inclination indicator I thereon will be indicated by solid lines and the other parts of the apparatus will be indicated by broken lines.

Figure 31:
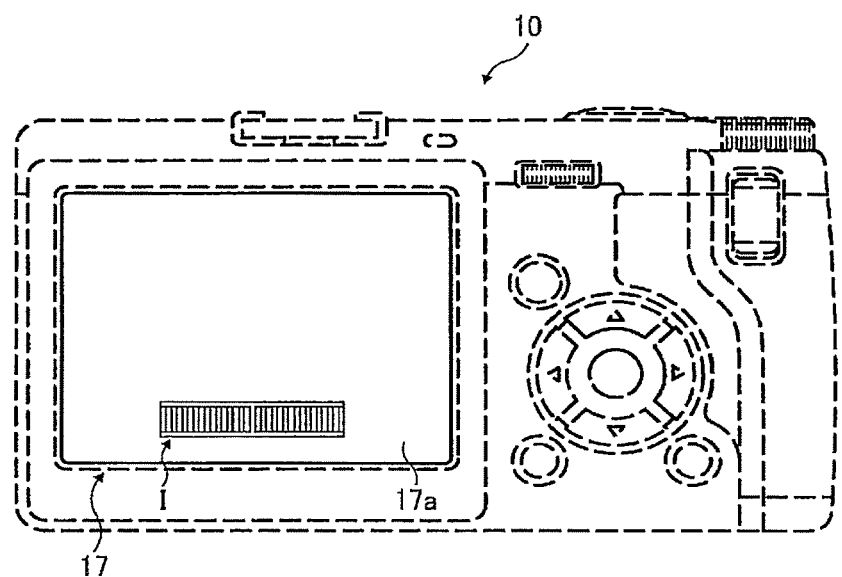
FIG. 31 shows the inclination indicator I indicating a horizontal state on a horizontal image Ps according to the seventh embodiment.
Figure 32:
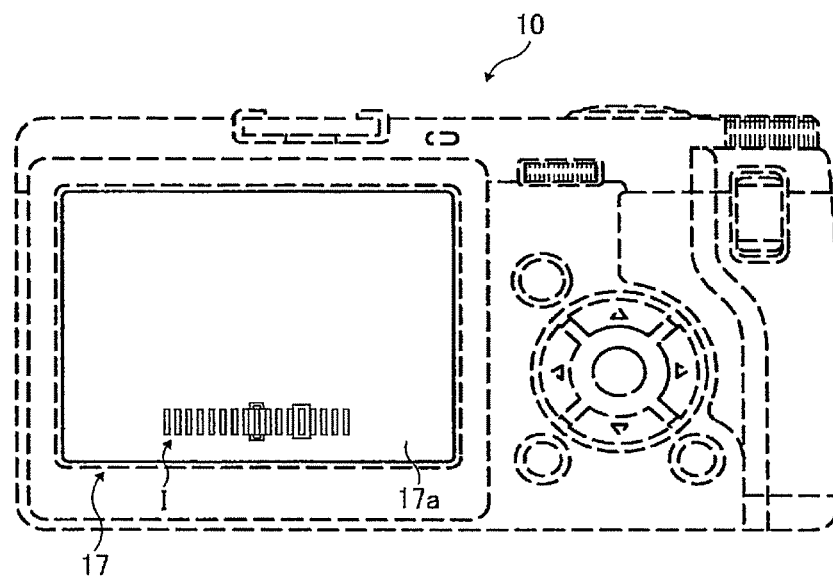
FIG. 32 shows the inclination indicator I indicating an inclined state on the horizontal image Ps according to the seventh embodiment.
Figure 33:
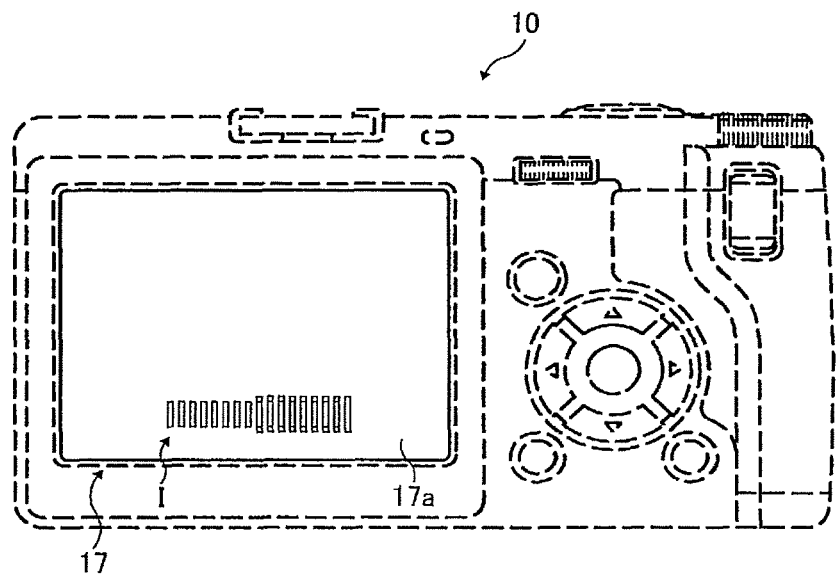
FIG. 33 shows the inclination indicator I indicating an extremely inclined state on the horizontal image Ps according to the seventh embodiment.
Figure 34:
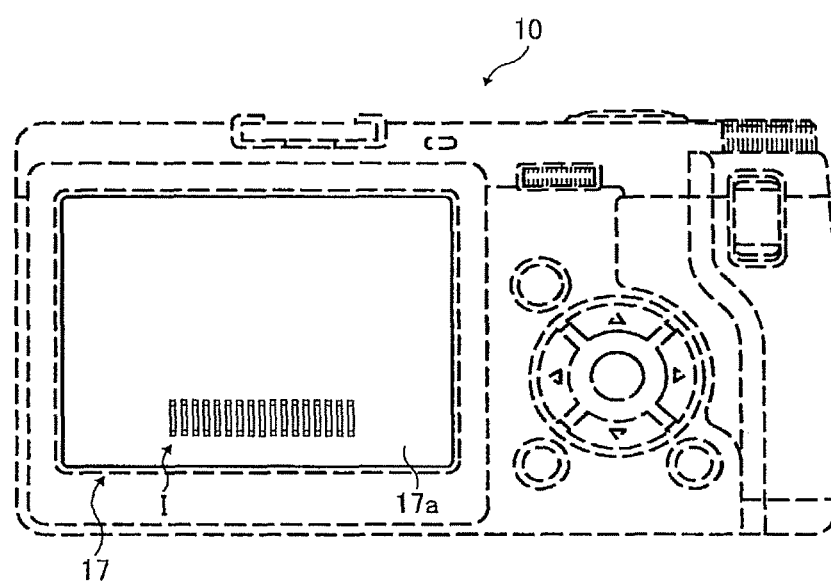
FIG. 34 shows the inclination indicator I indicating an extremely turned state in the pitch direction on the horizontal image Ps according to the seventh embodiment.

FIGS. 31 to 34 show a horizontal image Ps on the screen 17a. FIG. 31 shows the inclination indicator I indicating the horizontal state thereof, FIG. 32 shows the inclination indicator I indicating the degree of inclination, FIG. 33 shows the inclination indicator I indicating the extremely inclined state, and FIG. 34 shows the inclination indicator I indicating the extremely turned state in the pitch direction.

Figure 35:
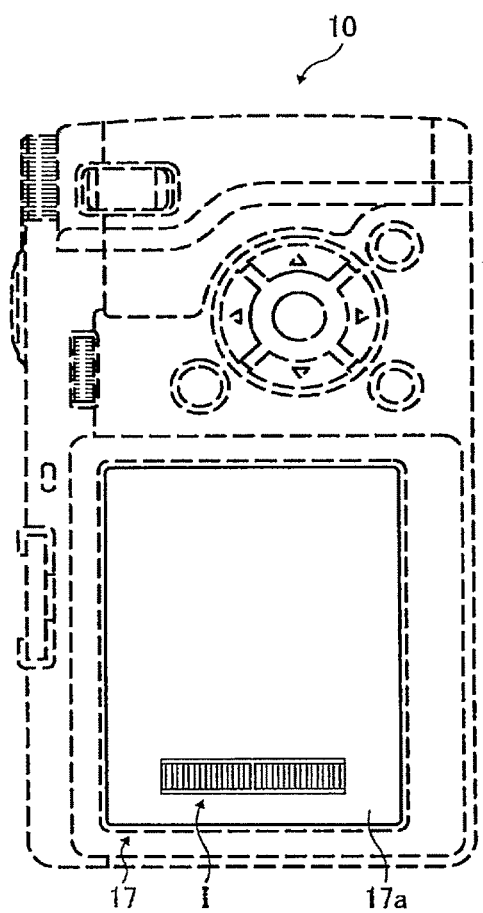
FIG. 35 shows the inclination indicator I indicating a horizontal state on a vertical image Pv according to the seventh embodiment.
Figure 36:
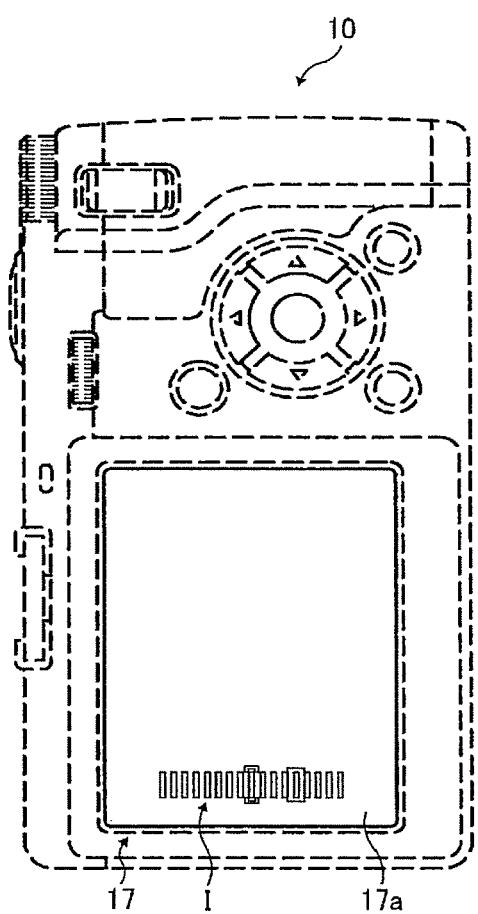
FIG. 36 shows the inclination indicator I indicating an inclined state on the vertical image Pv according to the seventh embodiment.
Figure 37:
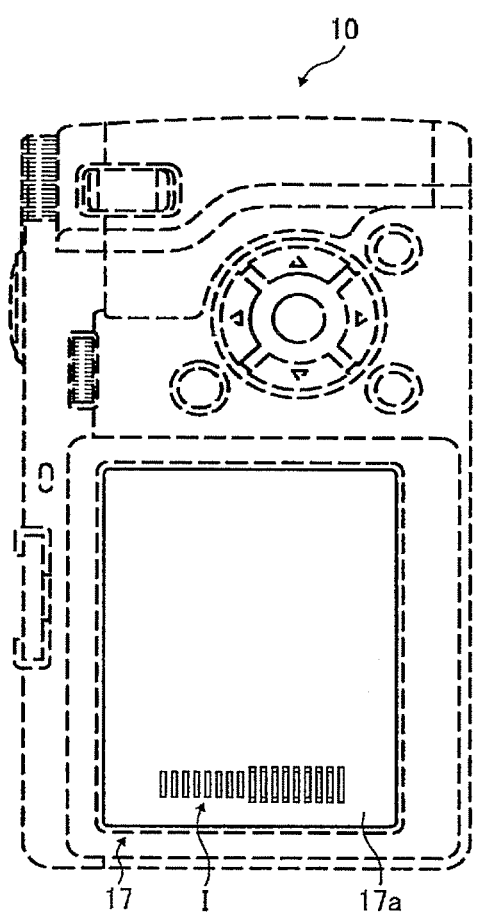
FIG. 37 shows the inclination indicator I indicating an extremely inclined state on the vertical image Pv according to the seventh embodiment.
Figure 38:
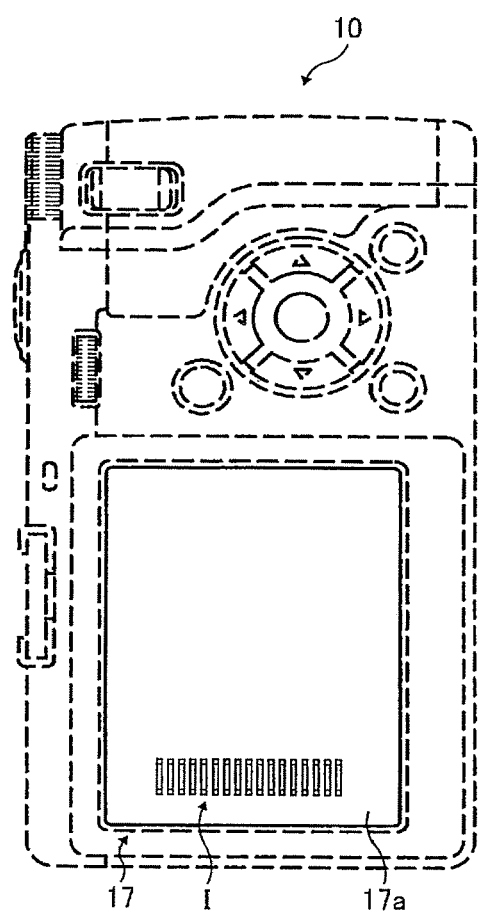
FIG. 38 shows the inclination indicator I indicating an extremely turned state in the pitch direction on the vertical image Pv according to the seventh embodiment.

Likewise, FIGS. 35 to 38 show a vertical image Pv on the screen 17a. FIG. 35 shows the inclination indicator I indicating the horizontal state thereof, FIG. 36 shows the inclination indicator I indicating the degree of inclination, FIG. 37 shows the inclination indicator I indicating the extremely inclined state, and FIG. 38 shows the inclination indicator I indicating the extremely turned state in the pitch direction.

Other examples of the inclination indicator I will be described with reference to FIGS. 39 to 53. The inclination indicator I is to help the user obtain images without inclination relative to a horizontal plane, and indicate the degree of inclination of the body case relative to the optical axis direction (Z-axis direction in FIG. 2). In FIGS. 39 to 53 the display unit 17 (screen 17a) and the inclination indicator I thereon will be indicated by solid lines and the other parts of the apparatus will be indicated by broken lines.

Eighth Embodiment

Figure 39:
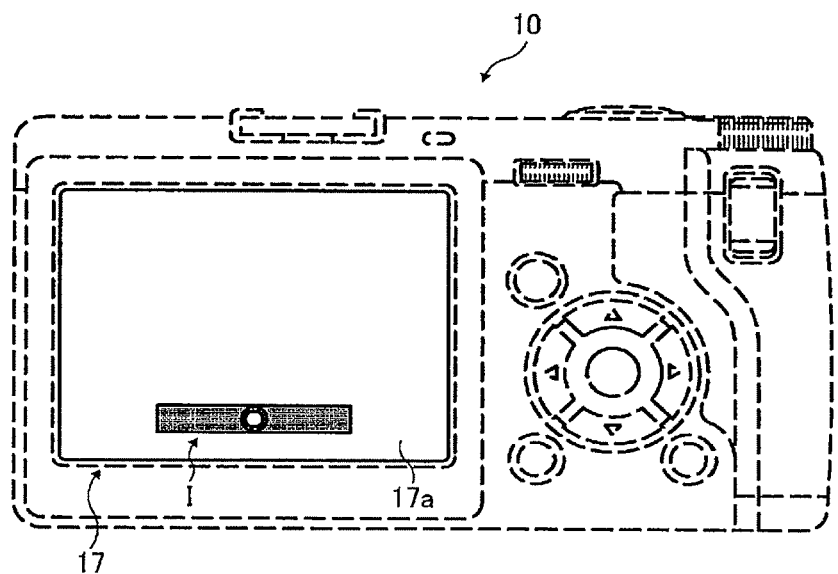
FIG. 39 shows the inclination indicator I indicating a horizontal state on the horizontal image Ps according to the eighth embodiment.
Figure 40:
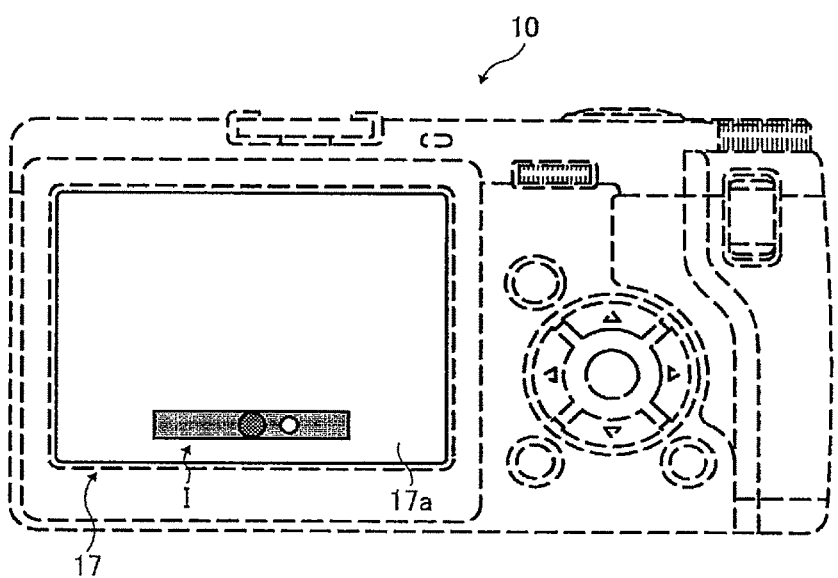
FIG. 40 shows the inclination indicator I indicating an inclined state on the horizontal image Ps according to the eighth embodiment.

FIGS. 39 and 40 show a modified example of the inclination indicator I. FIG. 39 shows the inclination indicator I indicating that the body case 11 is in the horizontal state. FIG. 40 shows the inclination indicator I indicating a degree of inclination of the body case 11. The inclination indicator I according to the present embodiment has a rectangular shape and extends along the horizontal criterion. It includes a black circular index indicating the center, and a white circular index smaller than the black circular index.

In the inclination indicator I of the present embodiment, the white circular index moves in accordance with the degree of inclination. When the body case 11 is in the horizontal state, the black and white circular indexes are concentrically superimposed on the screen (FIG. 39). With a small inclination of the body case 11, the white circular index locates at a position close to the black circular index (FIG. 40). As inclination of the body case 11 increases, the white circular index moves away from the black circular index in the inclination indicator I. FIG. 40 shows the inclination indicator I when the right side surface of the body case 11 is inclined upward.

Ninth Embodiment

Figure 41:
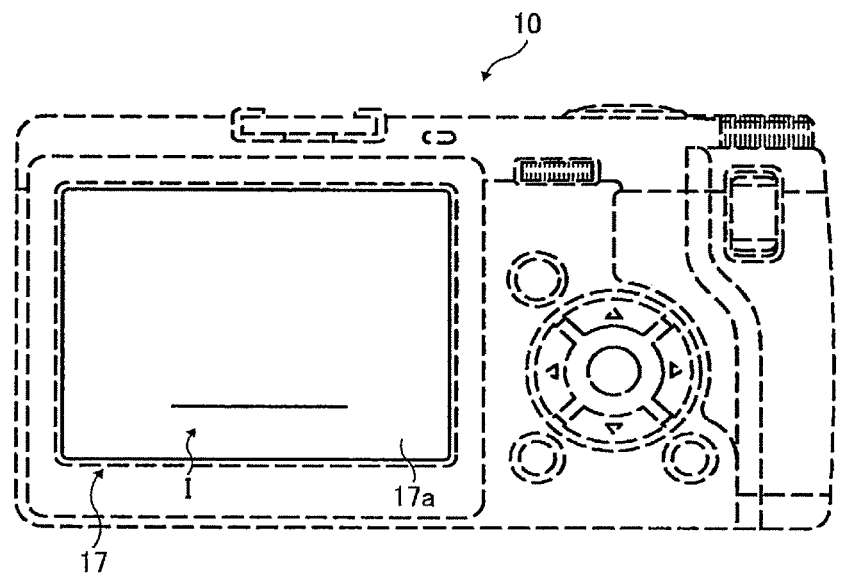
FIG. 41 shows the inclination indicator I indicating a horizontal state on the horizontal image Ps according to the ninth embodiment.
Figure 42:
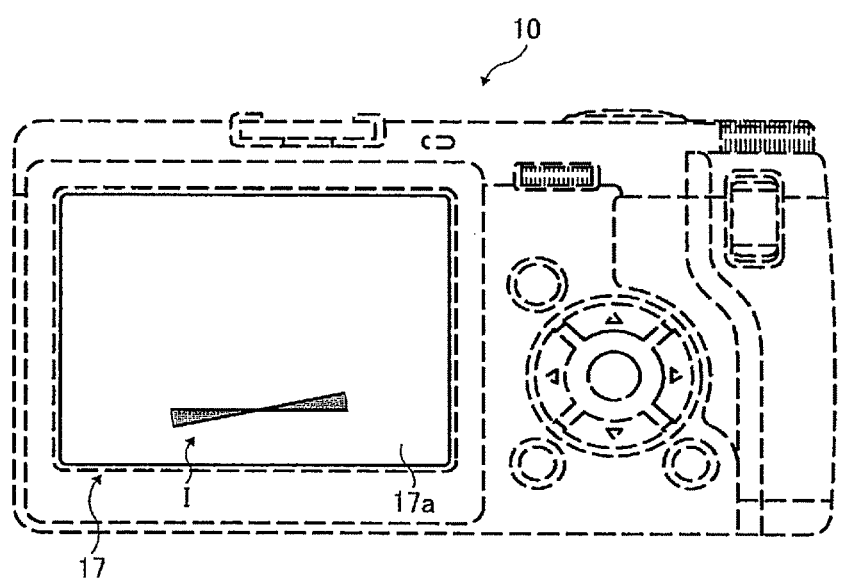
FIG. 42 shows the inclination indicator I indicating an inclined state on the horizontal image Ps according to the ninth embodiment.

FIGS. 41, 42 show another modified example of the inclination indicator I. FIG. 41 shows the inclination indicator I indicating that the body case 11 is in the horizontal state. FIG. 42 shows the inclination indicator I indicating a degree of inclination of the body case 11. The inclination indicator I according to the present embodiment includes a horizontal line extending along the horizontal criterion and an index line to indicate a degree of inclination of the body case 11 relative to the horizontal line. The index line is turned around the center position of the horizontal line to indicate the degree of inclination.

In the inclination indicator I of the present embodiment, the horizontal line and the index line are shifted from each other to making fan-like areas therebetween. Both of the lines and the fan-like areas are visually distinguishable. The inclination indicator I indicates the horizontal state of the body case 11 with a single line, the horizontal line and index line overlapped with each other (FIG. 41). With a small inclination of the body case 11, a shift between the horizontal line and index line (fan areas) becomes small (FIG. 42). As the inclination increases, the index line is turned and the size of the fan areas increases. FIG. 42 shows the inclination indicator I when the right side surface of the body case 11 is inclined upward.

Tenth Embodiment

Figure 43:
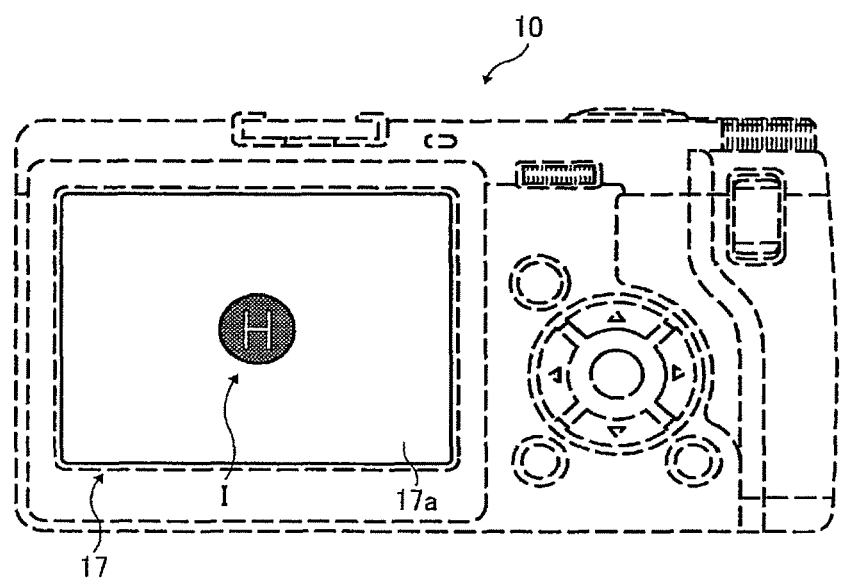
FIG. 43 shows the inclination indicator I indicating a horizontal state on the horizontal image Ps according to the tenth embodiment.
Figure 44:
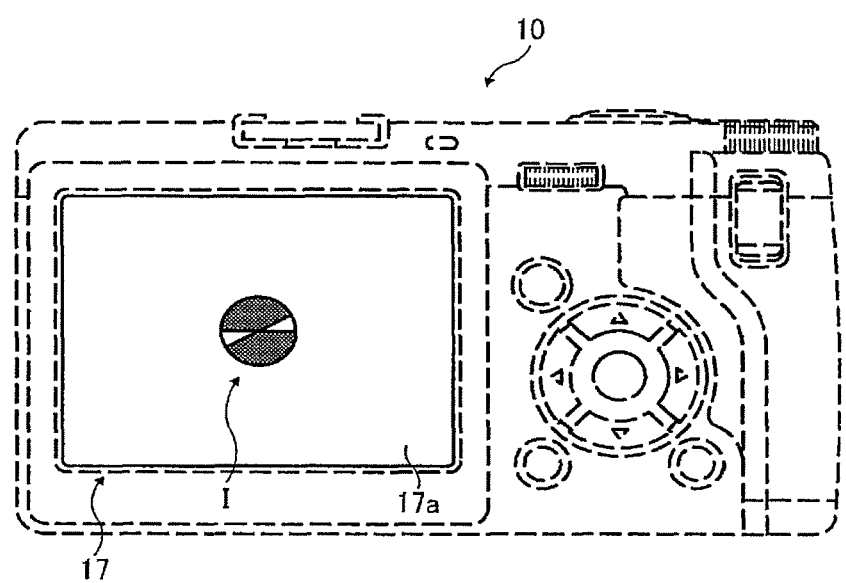
FIG. 44 shows the inclination indicator I indicating an inclined state on the horizontal image Ps according to the tenth embodiment.

FIGS. 43, 44 show another modified example of the inclination indicator I. FIG. 43 shows the inclination indicator I indicating that the body case 11 is in the horizontal state. FIG. 44 shows the inclination indicator I indicating a degree of inclination of the body case 11. The inclination indicator I according to the present embodiment includes a black circular mark at the center of the screen 17a. The black circular mark contains a horizontal line extending along the horizontal criterion and an index line to indicate a degree of inclination of the body case 11 relative to the horizontal line. The index line is turned around the center position of the horizontal line to indicate the degree of inclination.

In the inclination indicator I of the present embodiment, the horizontal line and the index line are shifted from each other to make white-colored fan-like areas. The inclination indicator I indicates the horizontal state of the body case 11 by a H-shaped white mark (initial of horizontal) on the black circular mark (FIG. 43). With a small inclination of the body case 11, the fan areas between both lines become small (FIG. 44). As the inclination increases, the index line is turned and the size of the fan areas increases. FIG. 44 shows the inclination indicator I when the right side surface of the body case 11 is inclined upward.

The inclination indicator I according to the present embodiment indicates the degree of inclination inside the black circular mark which locates at the center of the screen 17a. Therefore, the position of the inclination indicator I does not change on the screen irrespective of the horizontal or vertical image Ps, Pv. The user will not be bothered by the positional change of the inclination indicator I.

Eleventh Embodiment

Figure 45:
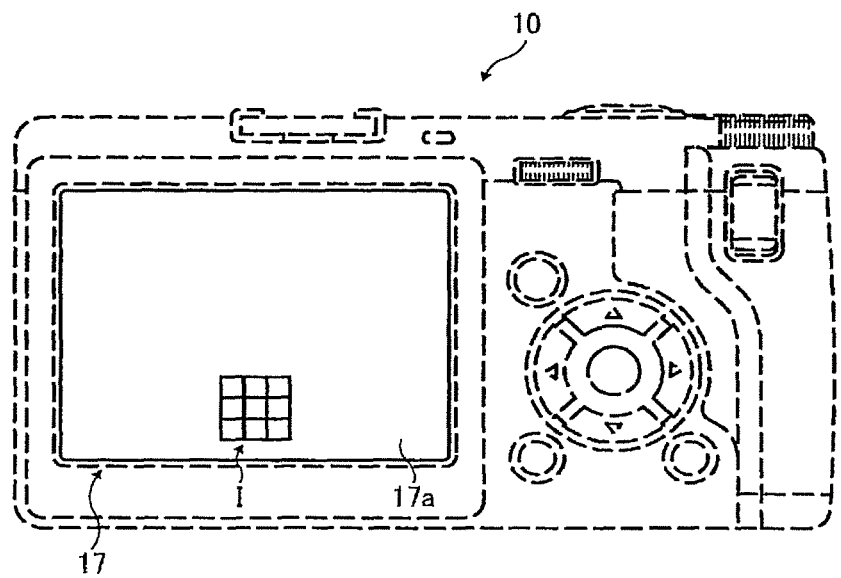
FIG. 45 shows the inclination indicator I indicating a horizontal state on the horizontal image Ps according to the eleventh embodiment.
Figure 46:
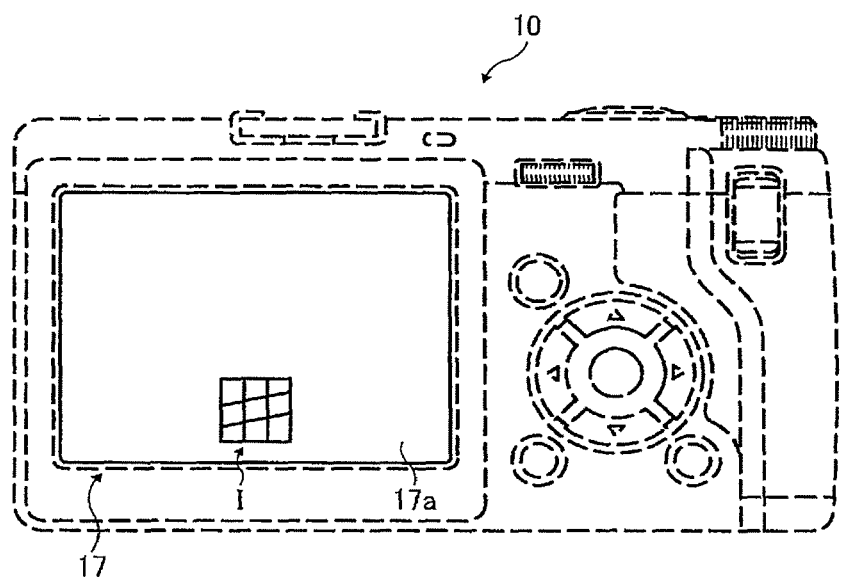
FIG. 46 shows the inclination indicator I indicating an inclined state on the horizontal image Ps according to the eleventh embodiment.

FIGS. 45, 46 show another modified example of the inclination indicator I. FIG. 45 shows the inclination indicator I indicating that the body case 11 is in the horizontal state. FIG. 46 shows the inclination indicator I indicating a degree of inclination of the body case 11. The inclination indicator I according to the present embodiment includes a square box with two vertical lines therein, and two index lines crossing the square box in a lateral direction to indicate the degree of inclination of the body case 11. The index lines are turned around the barycenter of the square box to indicate the degree of inclination.

The inclination indicator I according to the present embodiment indicates the horizontal state of the body case 11 by the index lines orthogonal to the vertical lines (FIG. 45). As the inclination of the body case 11 increases, the index lines are more largely inclined relative to the vertical lines (FIG. 46). FIG. 46 shows the inclination indicator I when the right side surface of the body case 11 is inclined upward.

Twelfth Embodiment

Figure 47:
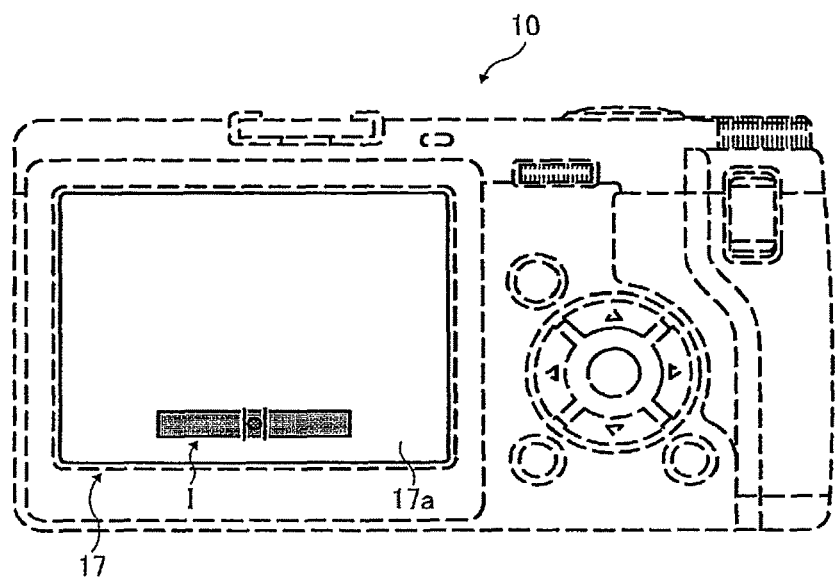
FIG. 47 shows the inclination indicator I indicating a horizontal state on the horizontal image Ps according to the twelfth embodiment.
Figure 48:
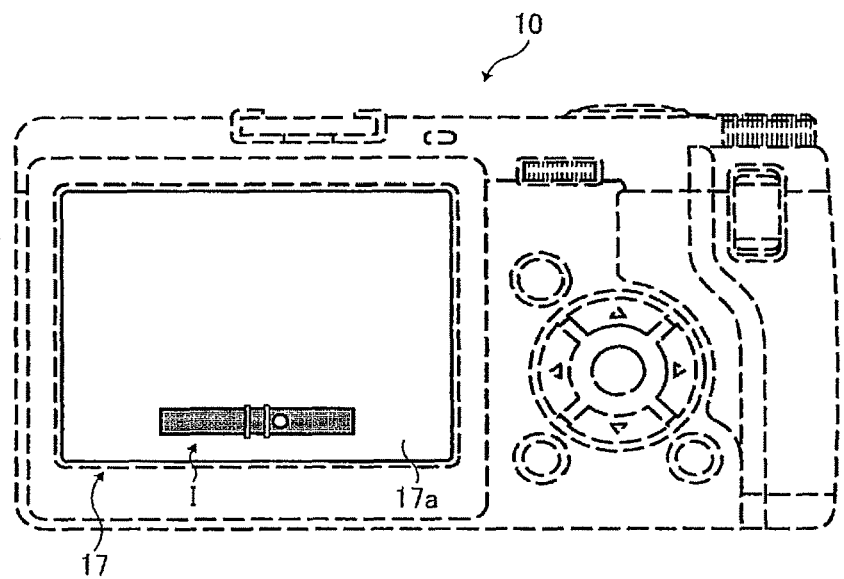
FIG. 48 shows the inclination indicator I indicating an inclined state on the horizontal image Ps according to the twelfth embodiment.

FIGS. 47, 48 show another modified example of the inclination indicator I. FIG. 47 shows the inclination indicator I indicating that the body case 11 is in the horizontal state. FIG. 48 shows the inclination indicator I indicating a degree of inclination of the body case 11. The inclination indicator I according to the present embodiment has a rectangular shape and extends along the horizontal criterion. It includes two white vertical lines indicating the center position and a white circular mark.

In the inclination indicator I the white circular mark moves in accordance with inclination of the body case 11. When the body case 11 is in the horizontal state, the white circular mark comes between the two vertical lines (FIG. 47). With a small inclination of the body case 11, the white circular mark locates at a position close to the two vertical lines (FIG. 48). As the inclination increases, the white circular mark moves away from the two vertical lines (FIG. 48). In the present embodiment the two vertical lines and the circular mark therebetween are displayed in black while the body case 11 is in the horizontal state (FIG. 47). FIG. 48 shows the inclination indicator I when the right side surface of the body case 11 is inclined upward.

Thirteenth Embodiment

Figure 49:
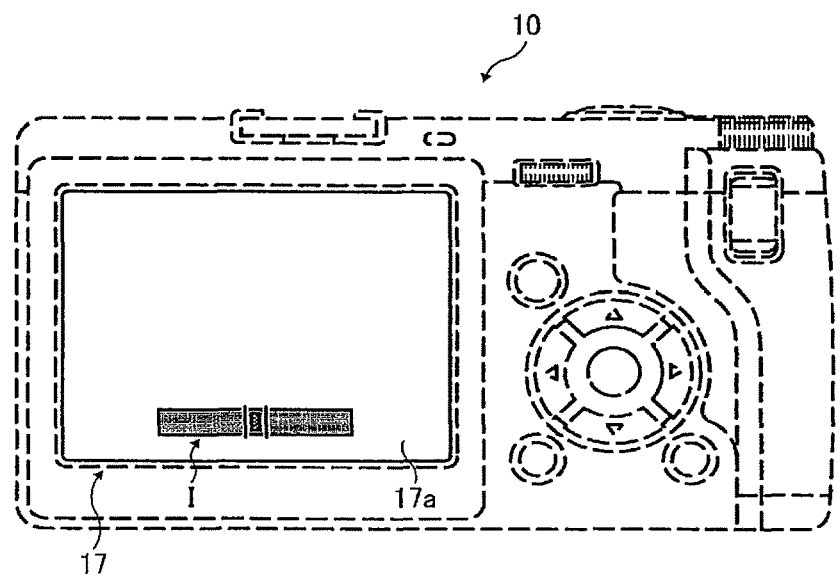
FIG. 49 shows the inclination indicator I indicating a horizontal state on a horizontal image Ps according to the thirteenth embodiment.
Figure 50:
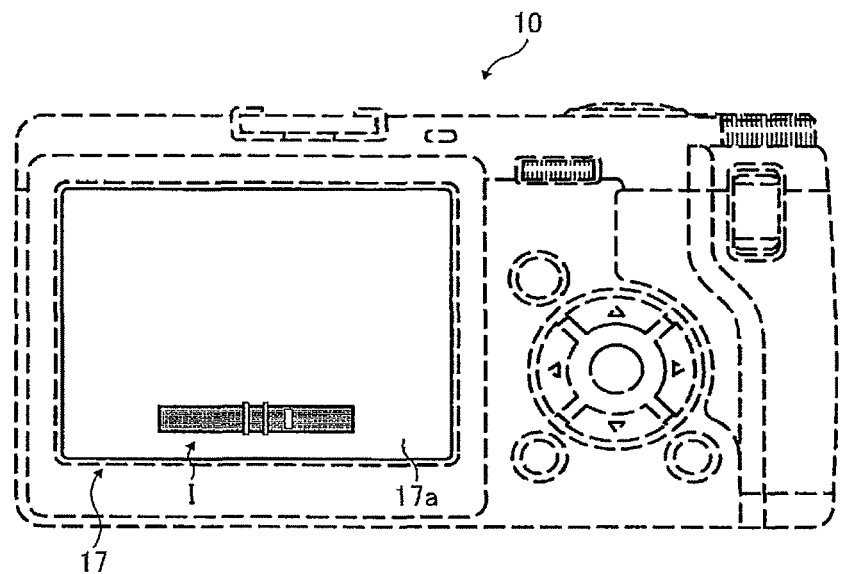
FIG. 50 shows the inclination indicator I indicating an inclined state on the horizontal image Ps according to the thirteenth embodiment.

FIGS. 49, 50 show another example of the inclination indicator I. FIG. 49 shows the inclination indicator I indicating that the body case 11 is in the horizontal state. FIG. 50 shows the inclination indicator I indicating a degree of inclination of the body case 11. The inclination indicator I in the present embodiment is the same in terms of structure and operation as that in the twelfth embodiment except that the circular mark is replaced by a rectangular mark.

Fourteenth Embodiment

Figure 51:
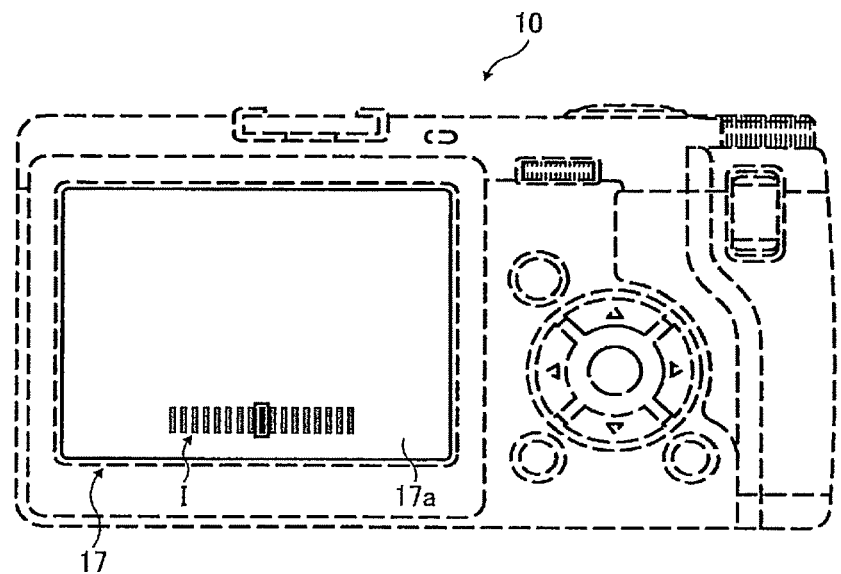
FIG. 51 shows the inclination indicator I indicating a horizontal state on the horizontal image Ps according to the fourteenth embodiment.
Figure 52:
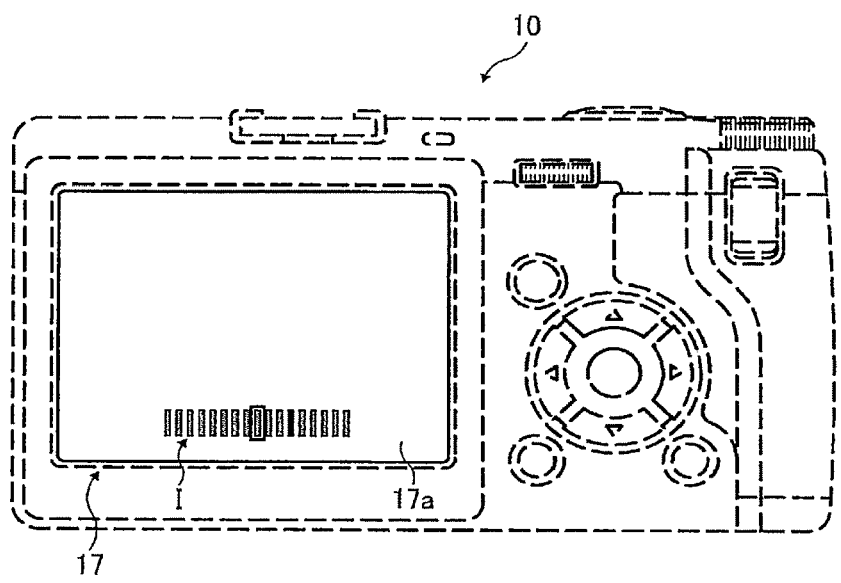
FIG. 52 shows the inclination indicator I indicating an inclined state on the horizontal image Ps according to the fourteenth embodiment.
Figure 53:
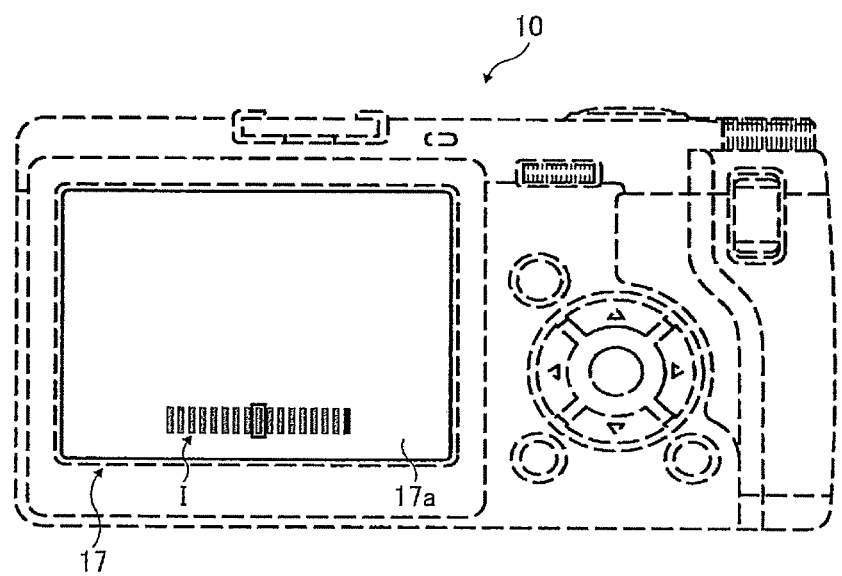
FIG. 53 shows the inclination indicator I indicating an extremely inclined state on the horizontal image Ps according to the fourteenth embodiment.

FIGS. 51 to 53 show another example of the inclination indicator I. FIG. 51 shows the inclination indicator I indicating that the body case 11 is in the horizontal state. FIG. 52 shows the inclination indicator I indicating a degree of inclination of the body case 11, and FIG. 53 the inclination indicator I indicating the extremely inclined state of the body case 11. The inclination indicator I according to the present embodiment includes vertically long stick portions arranged with an equal interval along the horizontal criterion, and a box portion to surround a stick portion located at the center. One of the stick portions is highlighted in accordance with the inclination of the body case 11. The highlighting of the stick portion can be done in an arbitrary manner as long as the one corresponding to the inclination of the body case 11 is distinguishable from the other stick portions.

The inclination indicator I according to the present embodiment indicates the horizontal state of the body case 11 by highlighting a central stick portion surrounded by the box portion (FIG. 51). With a small inclination of the body case 11, a stick portion close to the box portion is highlighted. As the inclination increases, the one to be highlighted moves outward. With the inclination being over an angle corresponding to the outermost stick portion, the outermost stick portion is highlighted (FIG. 53). For indicating the horizontal state, the central stick portion is displayed in green while for indicating the degree of inclination, the stick portion in question is displayed in yellow. For indicating the extremely inclined state, the outermost stick portion is displayed in red. Thus, highlighting the stick portion in different colors and manners according to the degree of inclination makes the state of the body case 11 more easily recognizable.

Also, the inclination indicator I in the eighth to fourteenth embodiments can be configured to indicate the horizontal state and inclined state in different colors, to make the horizontal state of the body case 11 more recognizable.

Further, the inclination indicator I in the eighth to fourteenth embodiment is preferably transparent so that the captured image P is visible on the display unit 17.

As described through the above embodiments, the imaging apparatus can properly notify the degree of inclination with low and high resolutions using both of the display and sound without bothering the user.

Further, for a large inclination of the apparatus, it is possible to have the user know the inclination certainly by warning the user with the sound while for a small inclination, the user can know the inclination via the display. Thus, the user can decide on how to be notified of the inclination. Accordingly, the user can be notified of a large inclination by the alarm sound and of a small inclination with the inclination indicator on the display, thereby providing a useful system of notifying the degree of inclination.

Further, the alarm sound and the inclination indicator display are arbitrarily and independently settable, allowing the user to select it as he/she wishes.

Further, since the imaging apparatus includes the shake amount detector, it can decide on which of a fixed state and held state it is in without provision of an additional dedicated sensor, resulting in saving space and manufacture cost.

Further, having the stability detector and selector unit, the imaging apparatus can automatically determine on whether each of the inclination indicator and the alarm sound are to be executed or not. This can eliminate the necessity for the user to switch them, so that the user can focus on shooting operation smoothly without any interruption.

Further, the imaging apparatus is configured to indicate a change of the degree of inclination in a similar manner to a well-known bubble level which indicates inclination by a movement of an air bubble. Such a way of indication is familiar to the user; therefore, the user can know the degree of inclination of the apparatus more easily.

Further, according to the present invention the imaging apparatus is considered to be in a horizontal state while the inclination thereof is within the predetermined range of angles. Therefore, even without complete stillness of the apparatus, the reading of the inclination indicator does not change, which enables the user to easily know the horizontal state thereof without visual annoyance.

Further, in the imaging apparatus according to the present invention, each indicator portion of the inclination indicator is set to correspond to the predetermined range of angles, which can prevent the reading of the indicator from changing in accordance with a minute movement of the apparatus. This also enables the user to easily know the horizontal state thereof without visual annoyance.

Further, the imaging apparatus indicates the horizontal state, inclined state, extremely inclined state and extremely turned state in the pitch direction in different colors and manners, which makes it easier for the user to distinguish them and know the horizontal state or inclined state of the apparatus.

As described above, according to the present invention, the user can adjust the posture of the imaging apparatus without visual annoyance and capture images with no unintended inclination without visual annoyance.

The above embodiments have described the digital camera as an example of the imaging apparatus. However, the present invention is applicable to other types of imaging apparatus.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An imaging apparatus comprising:
   an imaging unit to capture an image of a subject;
   a display unit on which the image is displayed;
   an inclination detector to detect an inclination of the imaging apparatus;
   an inclination indicator unit to allow the display unit to display an indicator to indicate the inclination on the image captured by the imaging unit based on a result of the detection of the inclination detector,
   wherein the indicator comprises a plurality of indicator portions arranged with an equal interval in a predetermined criterial direction;
   when the inclination detected by the inclination detector is within a predetermined range of angles, the inclination indicator unit highlights a pattern of the indicator portions, using one of the indicator portions located at a center to indicate that the imaging apparatus is in a horizontal state;
   when the inclination detected by the inclination detector is beyond the predetermined range of angles, the inclination indicator unit highlights one of the indicator portions in accordance with a degree of the inclination to indicate that the imaging apparatus is in an inclined state; and
   when the imaging apparatus is greatly inclined beyond a degree of inclination corresponding to an outermost one of the indicator portions, the inclination indicator unit integrally highlights one of two outermost indicator portions and upper and lower ends of indicator portions on an inclined side, to indicate that the imaging apparatus is in an extremely inclined state; and
   when the inclination of the imaging apparatus becomes equal to or below the degree of inclination corresponding to the outermost one of the indicator portions, the inclination indicator unit highlights one of the indicator portions in accordance with a degree of the inclination detected by the inclination detector to indicate that the imaging apparatus is in an inclined state.

2. An imaging apparatus according to claim 1, wherein the highlighted pattern is laterally facing H-shaped, using the indicator portion located at the center, an upper edge line bridging upper ends of all the indicator portions and a lower edge line bridging lower ends of all the indicator portions.

3. An imaging apparatus according to claim 1, wherein when the imaging apparatus is inclined beyond a predetermined angle in a plane orthogonal to the predetermined criterial direction, the inclination indicator unit concurrently highlights upper and lower ends of all the indicator portions, to indicate that the imaging apparatus is in an extremely turned state in a pitch direction.

4. An imaging apparatus according to claim 1, wherein the indicator includes a target indicator to indicate one of the indicator portions located at the center thereof.

5. An imaging apparatus according to claim 1, wherein the inclination indicator unit highlights the indicator portions in different colors for indicating the horizontal state and the inclined state.

6. An imaging apparatus according to claim 1, wherein the inclination indicator unit highlights the indicator portions in different colors for indicating the horizontal state, the inclined state and the extremely inclined state.

7. An imaging apparatus according to claim 1, wherein the predetermined criterial direction is set separately for a horizontal position and a vertical position of the imaging apparatus.

8. An imaging apparatus according to claim 6, wherein the display unit displays the indicator near a lower side thereof relative to a direction of gravity.

9. An imaging apparatus according to claim 1, further comprising an operation unit through which a photographic instruction is given, wherein the imaging unit performs a photographic operation in accordance with the instruction given via the operation unit.

10. A non-transitory computer readable medium storing a program for a controller of an imaging apparatus which comprises an imaging unit to capture an image of a subject; a display unit on which the image is displayed; and an inclination detector to detect an inclination of the imaging apparatus, the program causing the controller to execute:
    determining an inclination of the imaging apparatus according to an output signal from the inclination detector;
    allowing the display unit to display an indicator to indicate the inclination on the image captured by the imaging unit based on a result of the detection of the inclination detector, the indicator comprising a plurality of indicator portions arranged with an equal interval in a predetermined criterial direction;
    highlighting a pattern of the indicator portions, using one of the indicator portions located at a center to indicate that the imaging apparatus is in a horizontal state, when the inclination detected by the inclination detector is within a predetermined range of angles;
    highlighting one of the indicator portions in accordance with a degree of the inclination to indicate that the imaging apparatus is in an inclined state when the inclination detected by the inclination detector is beyond the predetermined range of angles; and
    integrally highlighting one of two outermost indicator portions, and upper and lower ends of indicator portions on an inclined side to indicate that the imaging apparatus is in an extremely inclined state, when the imaging apparatus is greatly inclined beyond a degree of inclination corresponding to an outermost one of the indicator portions; and highlighting one of the indicator portions in accordance with a degree of the inclination detected by the inclination detector, when the inclination of the imaging apparatus becomes equal to or below the degree of inclination corresponding to the outermost one of the indicator portions.

11. The medium according to claim 10, wherein the highlighted pattern is laterally facing H-shaped, using the indicator portion located at the center, an upper edge line bridging upper ends of all the indicator portions and a lower edge line bridging lower ends of all the indicator portions.

12. The medium according to claim 10, wherein the program further causes the controller to execute concurrently highlighting upper and lower ends of all the indicator portions, to indicate that the imaging apparatus is in an extremely turned state in a pitch direction, when the imaging apparatus is inclined beyond a predetermined angle in a plane orthogonal to the predetermined criterial direction.

13. The medium according to claim 10, wherein the program further causes the controller to execute allowing the imaging unit to perform a photographic operation in accordance with a photographic instruction while displaying the indicator on the display unit.

14. An inclination display method using an imaging apparatus which comprises an imaging unit to capture an image of a subject, a display unit on which the image is displayed, and an inclination detector to detect an inclination of the imaging apparatus, the method comprising the steps of:
   determining an inclination of the imaging apparatus according to an output signal from the inclination detector;
   allowing the display unit to display an indicator to indicate the inclination on the image captured by the imaging unit based on a result of the detection of the inclination detector, the indicator comprising a plurality of indicator portions arranged with an equal interval in a predetermined criterial direction;
   highlighting a pattern of the indicator portions, using an indicator portion located at a center to indicate that the imaging apparatus is in a horizontal state, when the inclination detected by the inclination detector is within a predetermined range of angles; and
   highlighting one of the indicator portions in accordance with a degree of the inclination to indicate that the imaging apparatus is in an inclined state, when the inclination detected by the inclination detector is beyond the predetermined range of angles; and
   integrally highlighting one of two outermost indicator portions, and upper and lower ends of indicator portions on an inclined side to indicate that the imaging apparatus is in an extremely inclined state, when the imaging apparatus is greatly inclined beyond a degree of inclination corresponding to an outermost one of the indicator portions; and
   highlighting one of the indicator portions in accordance with a degree of the inclination detected by the inclination detector, when the inclination of the imaging apparatus becomes equal to or below the degree of inclination corresponding to the outermost one of the indicator portions.

15. An inclination display method according to claim 14, wherein the highlighted pattern is laterally facing H-shaped, using the indicator portion located at the center, an upper edge line bridging upper ends of all the indicator portions and a lower edge line bridging lower ends of all the indicator portions.

16. An inclination display method according to claim 14, further comprising the step of concurrently highlighting upper and lower ends of all the indicator portions to indicate that the imaging apparatus is in an extremely turned state in a pitch direction, when the imaging apparatus is inclined beyond a predetermined angle in a plane orthogonal to the predetermined criterial direction.

17. An inclination display method according to claim 14, further comprising the step of allowing the imaging unit to perform a photographic operation in accordance with a photographic instruction while displaying the indicator on the display unit.

\* \* \* \* \*

UNITED STATES PATENT AND TRADEMARK OFFICE
CERTIFICATE OF CORRECTION

PATENT NO. : 8,422,873 B2
APPLICATION NO. : 13/476040
DATED : April 16, 2013
INVENTOR(S) : Junichi Shinohara et al.

It is certified that error appears in the above-identified patent and that said Letters Patent is hereby corrected as shown below:

On the Title Page

The Assignee information in (73) should read:

(73) Assignee: Ricoh Company, Ltd., Tokyo (JP)

Signed and Sealed this
Sixteenth Day of July, 2013

Teresa Stanek Rea
*Acting Director of the United States Patent and Trademark Office*